(12) United States Patent
Vagarali et al.

(10) Patent No.: US 6,908,674 B2
(45) Date of Patent: Jun. 21, 2005

(54) JADEITE AND ITS PRODUCTION

(75) Inventors: Suresh Shankarappa Vagarali, Columbus, OH (US); Thomas Richard Anthony, Schenectady, NY (US); John Casey, Dublin (IE); Robert Charles DeVries, Burnt Hills, NY (US); Stephen Lee Dole, Columbus, OH (US); John William Lucek, Powell, OH (US); Alan Cameron Smith, Dublin (IE); Biju Varghese, Worthington, OH (US); Steven William Webb, Worthington, OH (US)

(73) Assignee: Diamond Innovations, Inc., Worthington, OH (US)

( * ) Notice: Subject to any disclaimer, the term of this patent is extended or adjusted under 35 U.S.C. 154(b) by 473 days.

(21) Appl. No.: 09/799,192

(22) Filed: Mar. 5, 2001

(65) Prior Publication Data

US 2003/0031869 A1 Feb. 13, 2003

Related U.S. Application Data

(63) Continuation-in-part of application No. 09/737,667, filed on Dec. 15, 2000, now abandoned.

(51) Int. Cl.$^7$ .................................................. B32B 5/16
(52) U.S. Cl. ........................ 428/402; 428/406; 65/33.7; 65/102; 65/111
(58) Field of Search ................................. 428/402, 406; 65/33.7, 102, 111

(56) References Cited

U.S. PATENT DOCUMENTS 5,948,129 A * 9/1999 Nonami ...................... 65/33.1
6,154,573 A 11/2000 Murayama et al.

FOREIGN PATENT DOCUMENTS

| EP | 0022177 | 1/1981 |
| FR | 2213827 | 8/1974 |
| JP | XP 002228430 | 7/1985 |
| JP | XP 002228439 | 7/1985 |
| JP | XP 002228429 | 3/1994 |
| JP | XP 002228525 | 5/1994 |

* cited by examiner

Primary Examiner—Leszek B Kiliman
(74) Attorney, Agent, or Firm—Pepper Hamilton LLP

(57) ABSTRACT

A jadeite material has a thickness in excess of about 1.0 mm and CIELAB indices of $L^*>42$, $a^*<-6$, and $b^*>+6$. The grain size of the jadeite material is less than about 30 microns and is an equiaxed grain structure. The jadeite material has an optical transmission peak between 500 and 565 nm with an $I/I_O$ optical transmission ratio of over 40%. The first step in making the jadeite material is to wrap a glass block, convertible by HP/HT into jadeite and having a nominal composition of $NaAlSi_2O_6$, with a graphite or refractive metal sheet. The wrapped glass block is placed in an HP/HT apparatus, rapidly heated, and subjected therein to a pressure in excess of about 3 GPa and a temperature in excess of about 1000° C. for a time adequate to convert the glass block into jadeite. The jadeite material then is cooled and the pressure subsequently released.

62 Claims, 16 Drawing Sheets

(4 of 16 Drawing Sheet(s) Filed in Color)

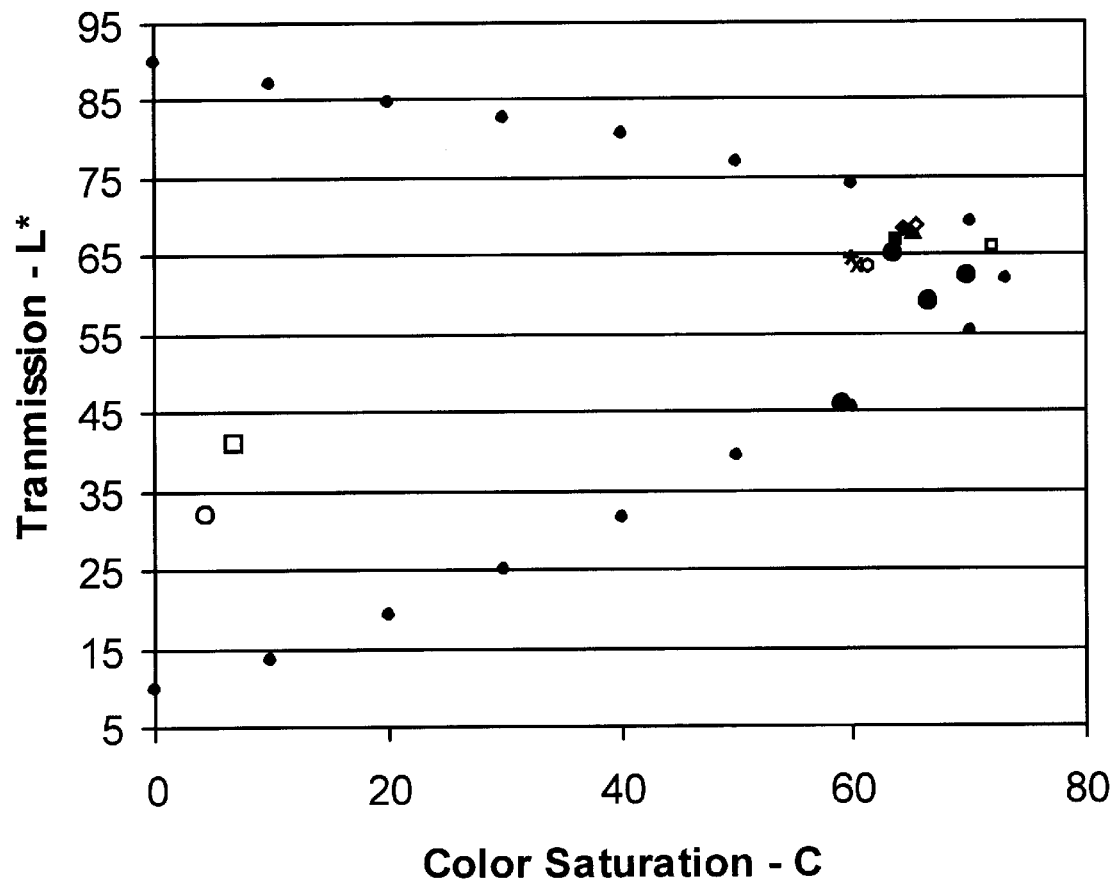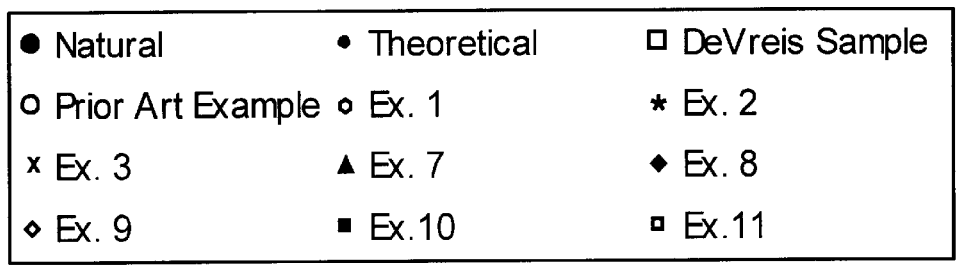
FIG. 10A

JADEITE AND ITS PRODUCTION

CROSS-REFERENCE TO RELATED APPLICATIONS

This application is a continuation in part of Ser. No. 09/737,667 filed Dec. 15, 2000, now abandoned.

STATEMENT REGARDING FEDERALLY SPONSORED RESEARCH

Not applicable.

BACKGROUND OF THE INVENTION

"Imperial" grade natural jadeite gems are extremely rare and highly valued with prices exceeding those of equivalently sized gem diamonds. The term "jade" as used in the gem trade refers to two minerals: jadeite ($NaAlSi_2O_6$) and nephrite ($Ca_2(Mg,Fe)_5Si_8O_{22}(OH)_2$). Before the 18$^{th}$ century, only nephrite had been found, mined, and carved into art objects or jewelry. During the 1700's, a new mineral, jadeite, was found in Burma. Jadeite is different in chemical composition from nephrite and can exhibit highly saturated colors and a higher degree of translucency, a higher hardness, and a glassy appearance. Because of its superior properties, jadeite quickly replaced nephrite as the "jade" of choice among art and gem collectors. Contemporary descriptions of "Imperial" jadeite cite the following qualitative attributes: a very intense and uniform green color ranging from "apple green" to "spinach green"; a high degree of uniform translucency; and an extremely smooth finish with a greasy feel and luster. The surfaces of natural gems often are treated with green waxes to improve color and translucency by filling surface defects.

Jadeite is a high-pressure polycrystalline mineral with nominal chemical composition of $NaAlSi_2O_6$ and a density of 3.3 g/cc. It occurs naturally in a variety of colors ranging from colorless or white to yellowish white, green, lavender, red, and black. A specific green hue is associated with "Imperial" jade and has been highly prized since its discovery. The color of jadeite is due to the presence of impurity elements. For example, the presence of iron and/or chromium imparts a green color to the mineral. Manganese provides a lavender color.

Since the 1950's, jadeite has been synthesized in laboratory quantities in high-pressure (HP) phase equilibrium experiments to elucidate planetary evolution. Temperatures over 600° C. (for hydrothermal synthesis) and pressures over 20 Kbar were required. These numerous works produced very small laboratory samples, typically less than 2 mm in any dimension and which were of no gemological value. A much smaller number of reports describe attempts to produce jadeite in gemologically valuable size and quality. These reports reveal that larger jadeite samples can be produced with nominal mineralogical attributes of density, refractive index, hardness, and crystallographic structure. None of these reports quantitatively describes the product or claims to synthesize "Imperial" grade jadeite. In fact, the most detailed evaluations of synthetic jadeite categorically state that "Imperial" quality was not achieved.

Shigley and Nassau, (Kurt Nassau and James E. Shigley, "A Study of the General Electric Synthetic Jadeite", *Gems & Gemology*, Spring 1987, pp. 27–35) provided the most complete gemological evaluation of synthetic jadeite. They report on several samples produced by high-pressure processes. The gemologists found that the synthetic materials were predominately jadeite and reproduced the chemical composition, refractive index, density, infrared spectra, x-ray patterns, fluorescence, and hardness values expected of natural jadeite. Samples up to 2.6 carats in weight were described. The authors also indicated that while this jadeite, "can be considered gem material, it does not match the highly translucent, almost transparent, quality of what is known in the trade as 'Imperial' jadeite'," and described the material as, "semi-translucent to opaque." The authors attributed the opacity to the presence of a minor concentration of glassy phase. They further noted that the color was concentrated in distinct areas providing a "mottled" and "granular" appearance. Lamellar cracks, unexpected trace contaminants, non-uniform polishing, and an unusual reflective property called "adventuresence" further distinguished the synthetic product from "Imperial" gem quality jadeite. FIG. 1, shows the lack of uniformity, cracking, and opacity of the materials evaluated by Shigley.

In two publications DeVries and Fleischer (DeVries and Fleischer, "Synthesis of Jadeite for Jewelry", *GE Technical Information Series*, 84 CRD 282, 1984; and DeVries and Fleischer, *Material Research Society Symp. Proc.* Vol 22, pp. 203–207, 1984, Elsevier Science Pub. Inc.), who successfully synthesized jadeite minerals more than 17 years ago, noted that, while of gemologically useful size, the "quality of Imperial jade is not achieved." The transparency of their products was limited by the presence of a residual eutectic material. Micrographs in their reports show this second phase to be present between 5 and 10 volume percent and up to 30 microns in size. These authors further describe non-uniform coloration as "mottled" and "mixed." Radial inhomogeneity and lateral cracking limited the size of gems that could be fabricated. While not cited by these authors as limiting transparency, the synthetic jadeite microstructures shown exhibited other defects: intergranular cracking of up to 30% of the grain boundaries; polishing pullout; and large, distinct grains averaging 30 microns in diameter and as large as 150 microns.

More recently, Zhao, et al. (Tinghe Zhao, et al., "The Physical and Chemical Properties of Synthetic and Natural Jade for Jewellery", *J. Material Science*, vol 29, 1996 pp. 1514–1520; Zhao, et al., "Synthesis of the clinopyroxenes $CaMgSi_2O_6$—$NaAlSi_2O_6$ for jewelry", *J. Material Science*, 30, 1995, pp. 1117–1123) describe an expanded range of process parameters used to synthesize gem-sized pieces of jadeite. The mineralogical and compositional properties of natural jadeite were achieved on samples twice the size of the DeVries materials. The largest sample prepared was approximately 15 carats in weight. The gemological quality of the samples is not described. These authors characterize the products as, "green," "emerald green," and "translucent." In the second reference, other colors were produced, but not in stoichiometric jadeite. In this second article, the translucency was described as "somewhat improved" but not measured. The jadeite microstructure in both Zhou references contains fibrous, elongated crystals up to 10 by 40 microns with very distinct grain boundaries.

With respect to the processes used by the foregoing authors to make synthetic Jadeite, DeVries and Fleischer used glass powders having the composition, $NaAlSi_2O_6$, and containing small amounts (0.5 to 2.0 weight-%) coloring agents, such as $Cr_2O_3$ for green and manganese oxides for lavender. The glass compositions were melted and crushed to achieve homogeneity. Crushed glass powders (−60/+100 mesh size) were placed in a high-pressure cell in direct contact with the heating element. The powders were sintered and annealed in the jadeite stable region of the pressure-temperature phase diagram. The mineralogical properties of jadeite were routinely obtained in this work. The samples produced were of poor quality and there was high incidence of cracking and delamination of the samples. This is attributed to the large volume reduction during sintering of glass powder into a dense jadeite sample. The packing density of glass powder is only ~60% of theoretical density of solid glass. Further, the jadeite glass phase itself has just 74% of the density of the crystalline jadeite phase of corresponding composition. Hence, sintering of jadeite glass powder to a jadeite crystal resulted in very large combined (60%) reduction in part volume during high-pressure processing. This large volume reduction causes distortion of the cell making the process less reliable, causing cracking, and limiting the size of samples that can be made by powder sintering. The authors attributed cracking and radial non-uniformities to the use of indirect heating. The cell used a graphite heater, which was in direct contact with the samples.

Zhao et aL's process also used a similar glass powder approach to make jadeite and jadeite-like clinopyroxenes by sintering at jadeite stable high-pressure and high temperature conditions. These investigators used a direct contact, indirect heated cell almost identical to the DeVries design. The quantitative details on the quality of the samples are not available other than that they were translucent and green in color.

These contemporary descriptions of synthetic jadeite qualitatively describe color, uniformity, translucency, and finish. None claim to have synthesized "Imperial" grade material. The most detailed reports categorically state that the "Imperial" quality level was not achieved.

Thus, despite the reported ability to synthesize jadeite under high-pressure processing conditions, no reports of Imperial jadeite have been published, regardless of size of the resulting jadeite synthesized. Thus, there exists a need in the art to manufacture jadeite of improved quality and size. There also is a need in the art to manufacture Imperial jadeite. The present invention is addressed to these needs.

BRIEF SUMMARY OF THE INVENTION

The invention is a man-made jadeite mineral that simultaneously and quantitatively achieves the color, translucency, uniformity, and finish of rare "Imperial" jadeite. Unlike prior art synthetic jadeite, which exhibits readily detectable lamellar cracking, significant opacity, mottled, and non-uniform coloration, the inventive jadeite material requires microscopic differentiation from "Imperial" grade jadeite. The invention features a microstructure that permits ready identification of the man-made product, preventing misrepresentation of the material. Additionally, the invention incorporates a repeatable, quantitative gemological specification distinguishing it from prior art.

The jadeite material has a thickness in excess of about 1.0 mm and CIELAB indices of $L^*>42$, $a^*<-6$, and $b^*>+6$. The grain size of the jadeite material is less than about 30 microns, and often less than about 10 microns, and is an equiaxed grain structure. The jadeite material has an optical transmission peak between 500 and 565 nm with an $I/I_O$ optical transmission ratio of over 40%.

The first step in making the jadeite material is to wrap a glass block (jadeite material precursor glass), convertible by HP/HT into jadeite and having a nominal composition of $NaAlSi_2O_6$, with a graphite or refractive metal sheet. The wrapped jadeite material precursor glass is placed in an HP/HT apparatus, rapidly heated, and subjected therein to a pressure in excess of about 3 GPa and a temperature in excess of about 1000° C. for a time adequate to convert the glass block into jadeite. The jadeite material then is cooled and the pressure subsequently released.

This process also can be used to produce gem materials from solid blocks of silicates, germanates, borates, and phosphates (glass-forming); as well as for colored or non-colored (transparent) ceramic materials useful in manufacturing dental appliances, optical components, and electro-optical materials, e.g., for telecommunications or lasers.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

For a fuller understanding of the nature and advantages of the present invention, reference should be had to the following detailed description taken in connection with the accompanying drawings, in which:

FIG. 10a is the CIELAB L-C color gamut saturation curve for "Imperial" jadeite green and comparisons of prior art, the inventive jadeite, and natural jadeite gems;

Figure 1:
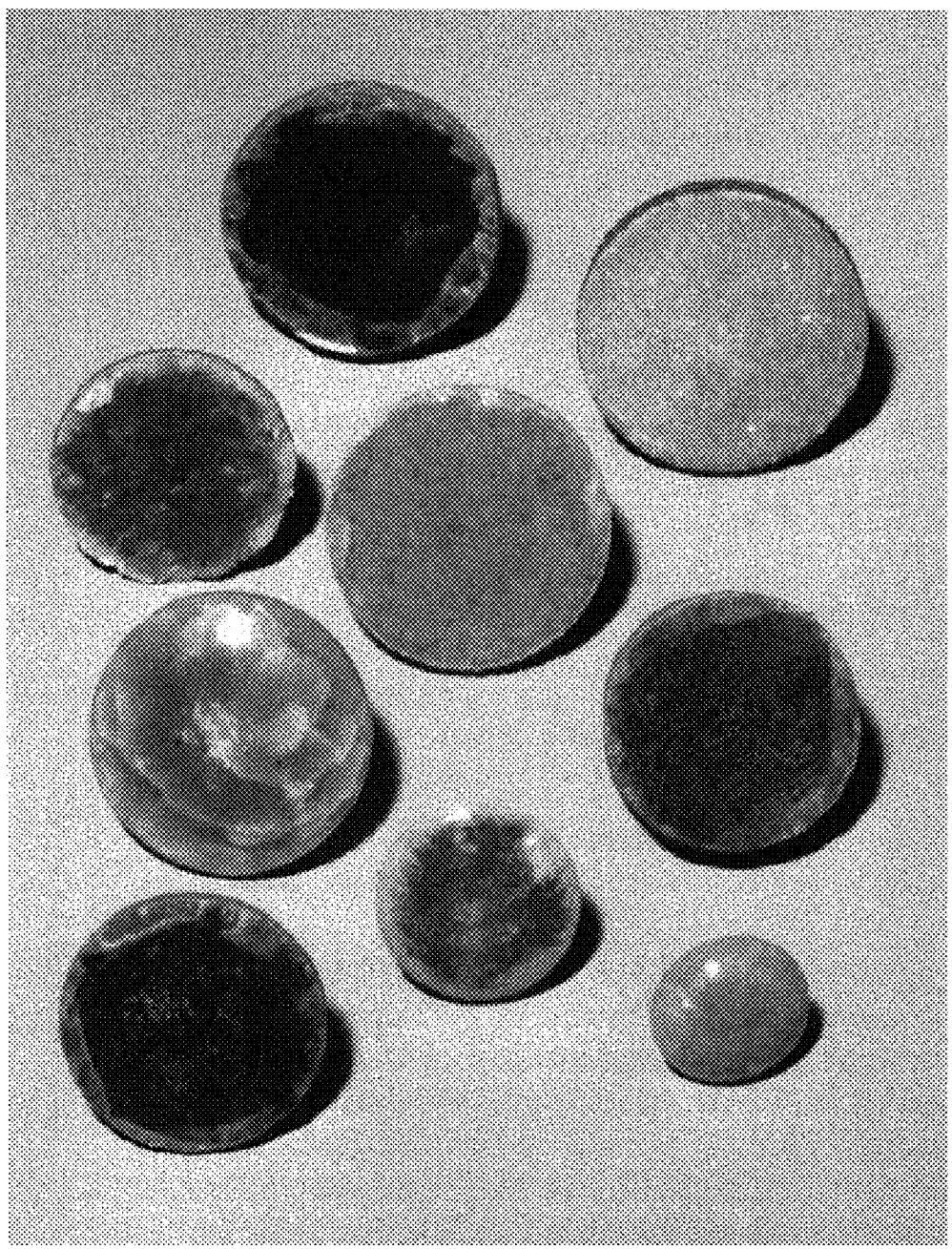
FIG. 1 shows the lack of uniformity, cracking, and opacity of the prior art materials evaluated by Shigley in the *Gems & Gemology* article, cited above.

The Figures will be described in more detail below.

DETAILED DESCRIPTION OF THE INVENTION

Manufacture of Imperial Jadeite

"Imperial" jadeite is highly valued not only for its inherent beauty, but also because nature only rarely provides the chemical and physical environment for its formation. Gemological references provide quantitative mineralogical attributes that allow the gem trade to distinguish simulants (i.e., simulated jadeite), nephrite, and other minerals, as well as treated (enhanced) natural materials, from true jadeite. These references do not provide quantitative specifications or a rigorous grading method for "Imperial" jadeite. Quantitative color, uniformity, and finish; and translucency specifications for "Imperial" grade jadeite differentiate the present invention from prior art.

Color manipulation of oxide materials is well described. Use of metallic ions to achieve various hues of green is disclosed in the prior art. It is also known that translucent polycrystalline ceramics must have polished surfaces to avoid scattering loss, low inherent absorption, grain boundaries without major refraction losses or scattering, and other scattering features minimized in frequency or intensity. The invention comprises proper coloration, polish, controlled absorption, and reduced scattering to achieve "Imperial" grade jadeite.

This invention uses a different approach to synthesize jadeite with color and translucency similar to those of "Imperial" grade natural jadeite. Instead of glass powder, this present invention uses solid blocks of glass. These glass blocks can be shaped as spheres, ellipsoids, cubes, parallelepipeds, pyramids, cones, regular and irregular polyhedrons, and other solid geometric forms. The glass has no porosity and, hence, the only volume change during jadeite formation is due to the glass-to-crystal phase change (~33%). This relatively low volume change contrasts to the very large volume change (~60%) associated with the glass powder-to-crystal phase change of the prior art. The advantages of this solid-glass method include the production of larger jadeite polycrystalline masses with fewer inclusions and cracks, no porosity, and better jadeite colors. The solid-glass method also minimizes the cell distortion and improves the consistency and yield of the process. The solid-glass method also insures a controlled uniform composition in the finished jadeite. The powder process, in contrast, has a large powder surface area from which volatile constituents can evaporate easily during processing, thereby inadvertently changing the composition or introducing undesirable concentration gradients in the jadeite.

The consistency of the starting glass provides the desired uniform coloration. The starting glass advantageously, then, should be of high quality with no undissolved material, bubbles, devitrification, or coloration heterogeneity. Optical quality seems desirable, but may not be necessary. The glass block can be formed by melting a pre-mixed powder consisting of the components, viz., $Na_2CO_3$, $Al_2O_3$, $SiO_2$, $Cr_2O_3$, etc., in the desired proportions and casting the melt in the form of an ingot. The pre-mixed powder could be made by physical blending of powder ingredients, pre-reacting some of ingredients before mixing, or by sol-gel technique. Solid blocks of glass are fabricated from the cast ingot.

Raw materials for forming the glass blocks can contain the following ingredients: 0.8–1.2 moles of a Na component, 0.8–1.2 moles of an Al component, 1.8–2.2 moles of an Si component, 5–7 moles of an oxygen component, 0–0.2 moles of an alkaline or alkaline earth element(s) (e.g., K, Li, Ca, Mg, Be), 0–0.5 moles of a transition element(s) (e.g., Fe, Cr, Mn, Ti, V, Ni, or other transition element), and 0–0.5 moles of a rare earth element (Nd, La, Ce, Pr, Sm, Eu, or other rare earth element). Preferred raw materials for forming the glass blocks include: 0.8–1.2 moles of a Na component, 0.8–1.2 moles of an Al component, 1.6–2.4 moles of an Si component, 4.8–7.2 moles of an oxygen component, 0–0.2 moles of an alkaline earth element(s) (e.g., Ca, Mg), and 0–0.5 moles of a transition element(s) (e.g., Fe, Cr, Mn).

The product jadeite, then, comprises the nominal $NaAlSi_2O_6$ composition with added impurities. In mineralogy terminology, the jadeite product can be represented as follows:

(Na, Alkali or Alkaline Earth)(Al, Transition Element, Rare Earth Element)$Si_2O_6$ where there is 0–0.2 mole of an alkali or alkaline earth metal element, 0–0.5 mole of a transition element, and 0–0.5 moles of a rare earth element.

Figure 2:
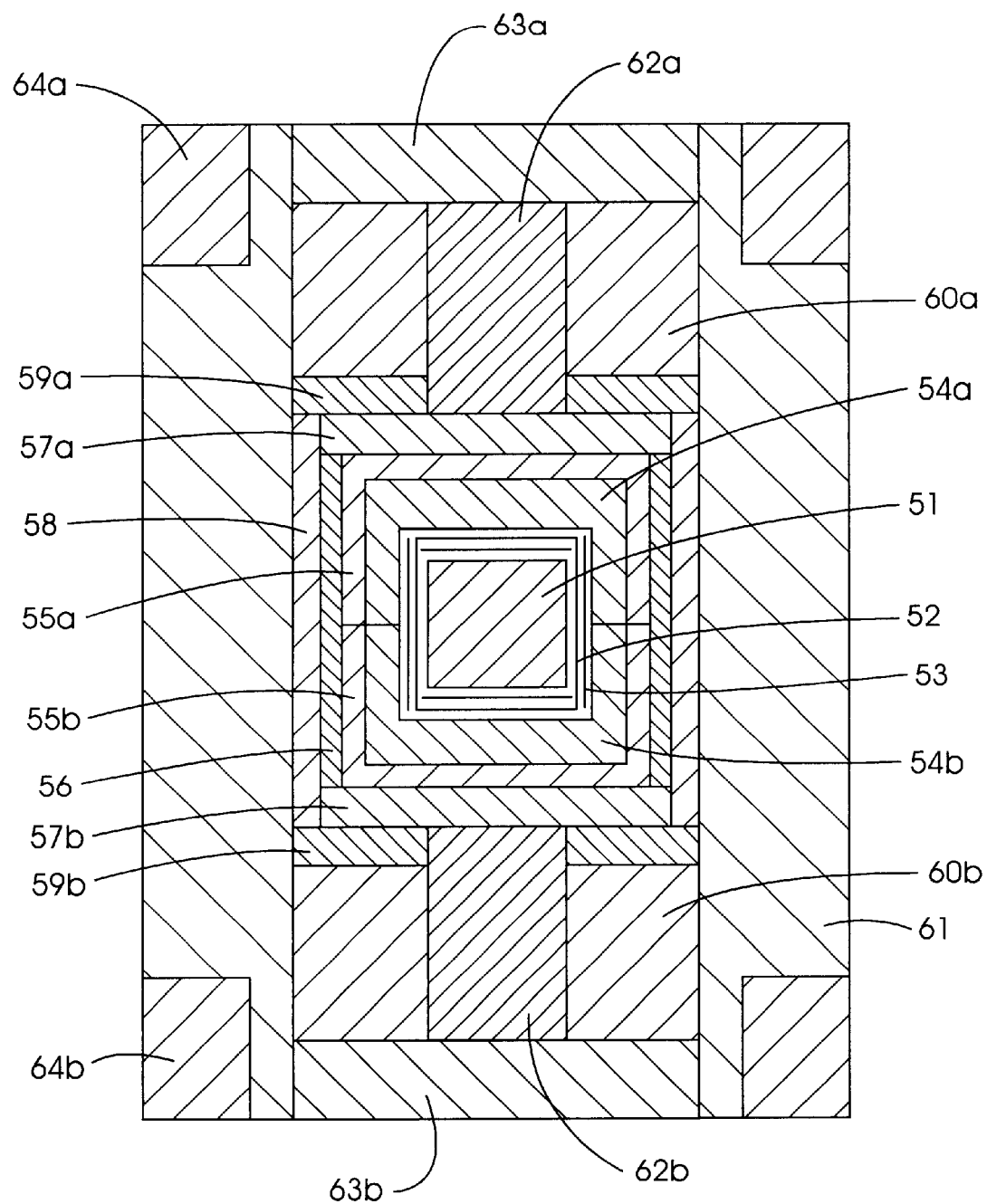
FIG. 2 is a schematic cross-section of the high-pressure reaction cell that was used in the Examples to manufacture the novel jadeite.

The reaction cell used to produce the inventive jadeite is schematically shown in FIG. 2. A glass cylinder, 51, is surrounded first by tantalum foil, 52, and then by Grafoil®, 53, (or vice versa) and placed in preformed pills, 54a and 54b. The pills are placed inside MgO cups, 55a and 55b, which then are inserted in heater assembly consisting of a graphite tube, 56, and graphite end discs, 57a and 57b. The heater assembly is surrounded by a MgO tube, 58, and by MgO discs, 59a and 59b, which are surrounded by pills, 60a and 60b, and by a cylinder, 61, made of black salt. Graphite pins, 62a and 62b, are inserted in salt pills and graphite discs, 63a and 63b, seal the ends of the salt cylinder, 61. Ceramic rings, 64a and 64b, are added to the cell to improve consistency of high-pressure runs.

This cell design overcomes many problems in prior art designs. The Ta and Grafoil® wraps prevent reaction of the glass material with surrounding cell components, viz., graphite. This improves the chemical homogeneity of the final product and avoids the radial non-uniformity of prior art. The wraps prevent attachment of the sample to the pressure transmission media reducing stress and concomitant cracking during depressurization. The reaction mass is heated by conduction and radiation through insulating masses—the cup and salt—that homogenizes the temperature gradients described in the prior art. Other refractory metal wraps include, for example, one or more of W, Nb, Mo, Zr, Ti, Hf, Va, Cr, Th, U, or alloys thereof.

Cell conditions established generally are within the high pressure/high temperature (HP/HT) range as established in the HP art. Such high pressures generally are in excess of 3 GPa with pressures of between about 3 and 6 GPa being suitable for present purposes. High temperatures are in excess of about 1000° C. with about 1000° to 1800° C. also being suitable for present purposes. Nucleation of jadeite crystals from the glass phase occurs on heating through a jadeite nucleation zone centered around 950° C. with a width of a few hundred degrees Centigrade, i.e., 850°→1050° Centigrade. Fast heating rates through this nucleation zone limit the number of jadeite crystal nuclei that form in this nucleation zone and thereby maximize the final sizes of the polycrystals in the jadeite. Slow heating rates through the nucleation zone allow many jadeite crystals to nucleate and, thus, minimize the final crystal sizes in the jadeite. Anneal times range from about 5 minutes to 72 hours and correspond with the above anneal temperatures and pressures. Slow cooling and gradual pressure release from peak values also have been determined to aid in suppressing cracking and delamination of the jadeite being produced. Cooling preferably is done at sufficiently high pressures (>2 GPa) to avoid any precipitation of albite or nepheline, which are the stable phases at low pressure. Precipitation of other phases in the pure jadeite causes both light absorption and Rayleigh scattering and, thereby, reduces the translucency of the jadeite. The appearance of other phases also may degrade the color of the jadeite. The combination of slow cooling rates and low pressures favor the appearance of these undesirable secondary phases. Such phases are most likely to nucleate at grain boundaries in the crystalline jadeite where the atomic kinetics are always the highest.

Jadeite Color and Translucency

Introduction

In the past, there has been a general bias in the gem industry against objective color measurements of gemstones. This bias stems from the view that each gemstone is considered and treated as an "object d'art" that can only be valued by its subjective beauty. However, this subjective approach is fatally flawed because of the lack of a standard observer. Moreover, objective color gratings have proven useful in many commercial settings, such as, for example, the paint, plastic, and automotive industries, and it is proving successful today for the first time in the gemstone industry. The color of a semitransparent gemstone, such as jadeite, can be specified through the use of color measuring instruments and color order systems. The most precise and intuitive system is the CIELAB color notation where the color and clarity of jadeite is specified with a series of numbers, e.g., $L^*=51$, $a^*=-40$ and $b^*=+33$.

The color and translucency of a gemstone has four major variables, namely: (1) the light source; (2) the colored gemstone itself; (3) the observer; and (4) the geometry of illumination and viewing. All of these variables must be standardized so that one can arrive at an objective specification of the color appearance of the gemstone.

The Illuminant

The Commission Internationale de d'Eclairage (CIE) designated illuminant D65 as the illuminant that most closely approximates northern daylight and is the illuminant of choice for gemstones. Other illuminants can be used if adjustments are later made during color measurement for their non-standard spectra.

Illumination and Viewing Geometry

Color measurement and specification are technologically well developed and rest on a firm scientific basis. The best system, the CIE measurement system, is based on the spectral response of the human eye. The human eye has three color receptors, each of which has a different spectral response. A spectrophotometer can measure either the light reflectance or transmittance of a gemstone as a function of its wavelength in the visible spectrum from 400 to 700 nm. The resulting spectrum can be adjusted for the illuminant of choice by a software program that adjusts the spectrum to one that would have been seen in standard northern daylight.

The standardized spectrum then is analyzed according to the response spectral function of the three-color receptors of the human eye to determine what color a human eye would see from this spectrum. For example, if the spectrum has a high relative intensity in the longer wavelength part of the visible spectrum, the gemstone will appear reddish to the human eye. Similarly, if the spectrum has a high relative intensity in the shorter wavelength part of the visible spectrum, the gemstone will appear blue to the human eye. Finally, if the spectrum has the highest relative intensity in the center of the visible spectrum, the gemstone will appear green to the human eye like Imperial jadeite.

For a semitransparent object, such as a gemstone, the illuminating and viewing geometry will affect the observed color. For example, if the illumination is done from the back and viewing is from the front of the gemstone, the transmission color of the gemstone will dominate. In contrast, if the illumination and viewing are both done from the front of the gemstone, the reflection color of the gemstone will dominate. In some gemstones, these colors can be very different. So, in specifying an objective color for the gemstone, the geometry of the illumination and viewing system also must be given.

The color of jadeite, most of which is semitransparent, is derived both from reflection and transmission. However, the color of a few types of jadeite, such as black jadeite, may be principally from reflection because of the opaqueness of these specimens. Nevertheless, the reflection mode was discarded because it would be sensitive to surface finish, surface discolorations, and specula reflections from glossy surfaces like those of a jadeite cabochon. Moreover, the most highly valued types of jadeite have a high degree of transparency that would not be characterized by the reflection method. Consequently, the mode of choice to characterize Imperial jadeite and similar high grades of jadeite is the transmission mode.

Figure 3:
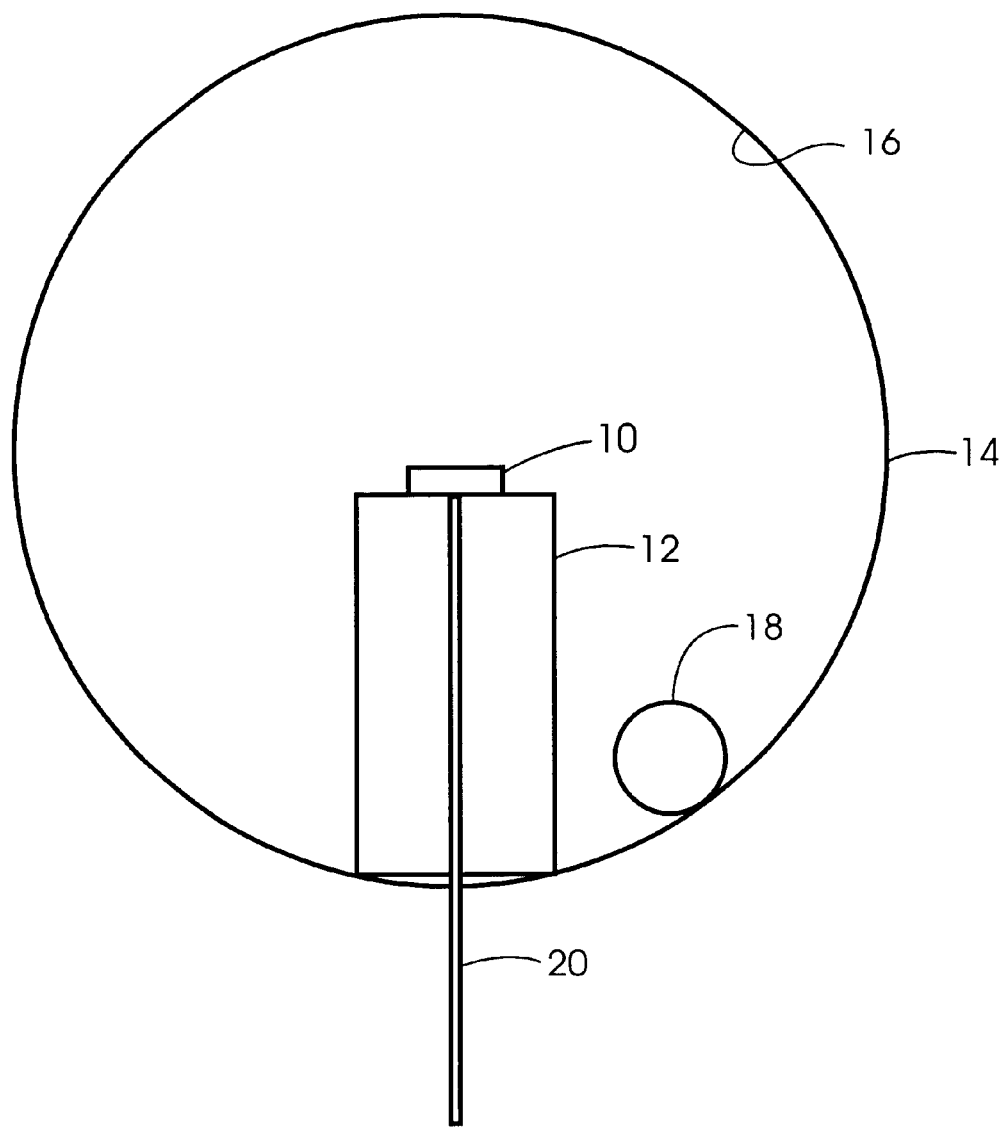
FIG. 3 is schematic of the set-up used to characterize jadeite samples using a spectrophotometer.

To characterize jadeite in a scientific manner, a transmission method was selected where the jadeite was placed between the illuminant and the viewer as shown in FIG. 3. The specimen, 10, was placed on a centered platform, 12, inside an integrating sphere, 14, with a white matte surface, 16. Integrating sphere 14 was illuminated by a light source, 18, which was not in direct view of specimen 10. Light from light source 18 was repeatedly reflected between different areas of white matte interior surface 16 of integrating sphere 14 so that the light was incident on specimen 10 from all hemispherical angles. Just beneath specimen 10 was an optical fiber, 20, which collected light that had been transmitted through specimen 10. The collected light was passed via optical fiber 20 to a spectrophotometer (not shown) where the specimen color was determined from its transmission spectrum. The commercial instrument used for this purpose was the SAS2000 Spectrophotometer Analysis System made by Adamas Gemological Laboratory of Brookline, Mass., USA.

The CIELAB Color Diagram

Figure 4:
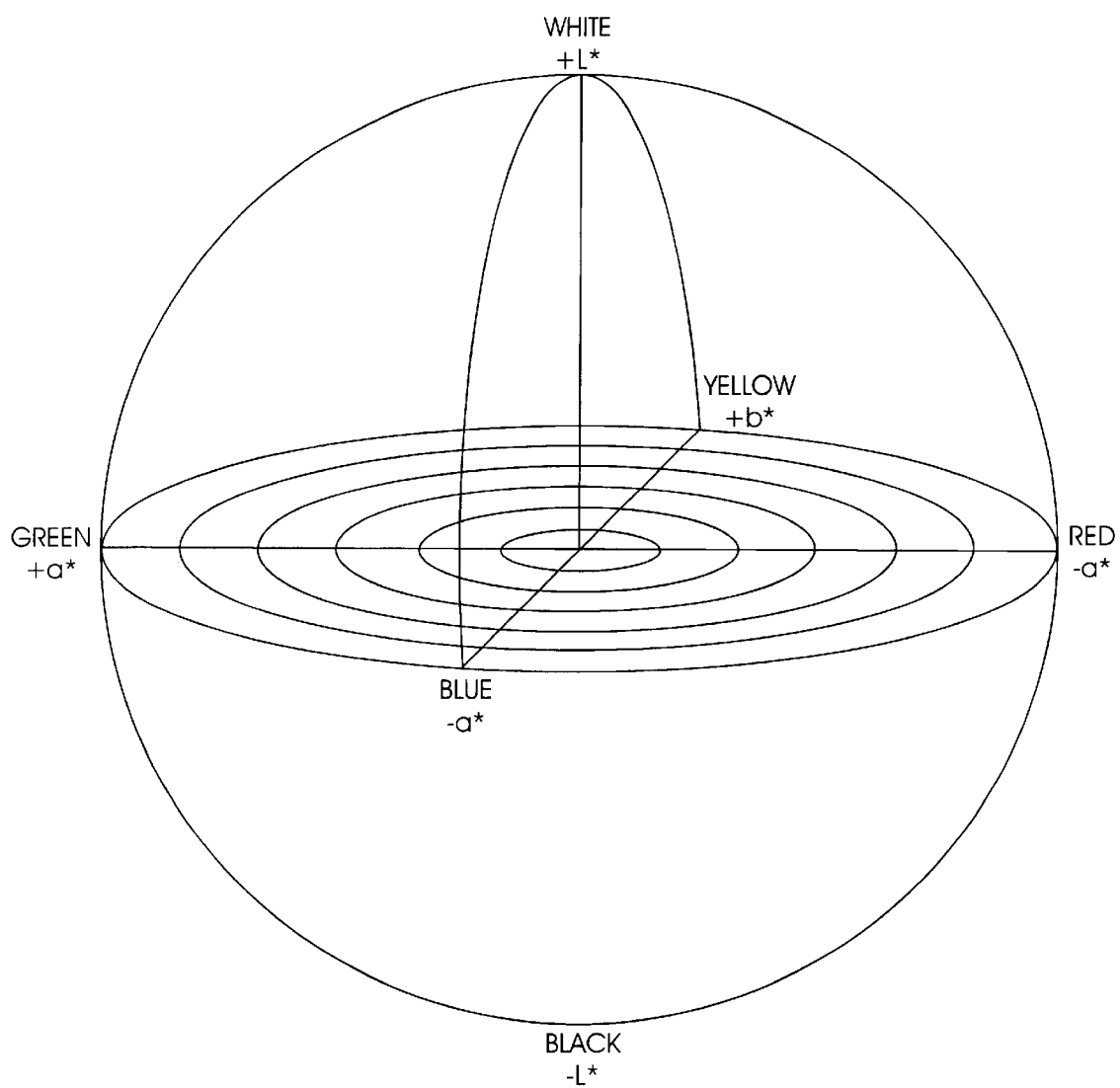
FIG. 4 shows the $a^*$, $b^*$ chromaticity diagram.

The CIELAB three-dimensional diagram was designed to be both precise and to appear logical to the human eye and brain. FIG. 4 shows the $L^*a^*b^*$ chromaticity diagram. One axis, $L^*$, indicates how light-dark a specimen is. It describes the lightness of a color and varies from black=0 to white= 100 in visually uniform steps of colorless gray in between. The other two axes contain, respectively, the opponent colors of red-green and yellow-blue. The idea of opponent colors derives from way the human eye and the neural networks of the brain perceive color. A human being cannot see a single hue as both red and green at the same time. Hence, red and green are opponent colors. Similarly, a human cannot see both blue and yellow as a single hue simultaneously, so blue and yellow also are opponent colors. In contrast to these opponent colors, both red and yellow can be seen as a single hue at the same time as in oranges, red and blue as in purples, etc. The CIELAB diagram takes advantage of the existence of opponent colors to make a unique diagram to specify any color. The opponent colors of red (+direction) and green (−direction) are plotted along and on opposing ends of a second orthogonal axis labeled $a^*$. In a similar manner, the opponent colors of yellow (+direction) and blue (−direction) are plotted on opposing ends of a third orthogonal axis labeled $b^*$. At the center of both the $a^*$ and $b^*$ axes, there is no color, just differing shades of gray as one moves up and down the $L^*$ axis. Movement towards either ends of the $a^*$ or $b^*$ axes corresponds with an increase in the intensity and saturation of the color. Because all colors can be made up of mixtures of light-dark ($L^*$), red-green ($a^*$), and blue-yellow ($b^*$), any color of any hue, saturation, and brightness can be plotted on the CIELAB diagram.

The CIELAB diagram also was carefully designed so that equal distances on the diagram correspond to equal hue, saturation, and lightness changes as observed by a human eye. The lack of correspondence between distance and perceived color changes was a major flaw of previous color diagrams. The difference, ΔE, between two colors located at random points on the CIELAB diagram can be calculated by applying the Pythagorean Theorem:

$$\Delta E = (\Delta a^{*2} + \Delta b^{*2} + \Delta L^{*2})^{1/2} \quad (1)$$

If the colors are at the same lightness level, i.e. ΔL*=0, Equation 1 reduces to $$\Delta C = (\Delta a^{*2} + \Delta b^{*2})^{1/2} \quad (2)$$

where, $$C = (a^{*2} + b^{*2})^{1/2} \quad (3)$$

The single dimension, C index, facilitates the balance of translucency and color saturation of a gemstone like jadeite. It is sometimes more convenient and useful to plot L* versus C in a two-dimensional diagram rather than L* versus a* and b* in a three-dimensional diagram if the color mixture or hue angle, i.e., the ratio of a*/b*, has been already fixed as it is with Imperial Green jadeite.

Accessibility in Color/Translucency Space

Figure 5:
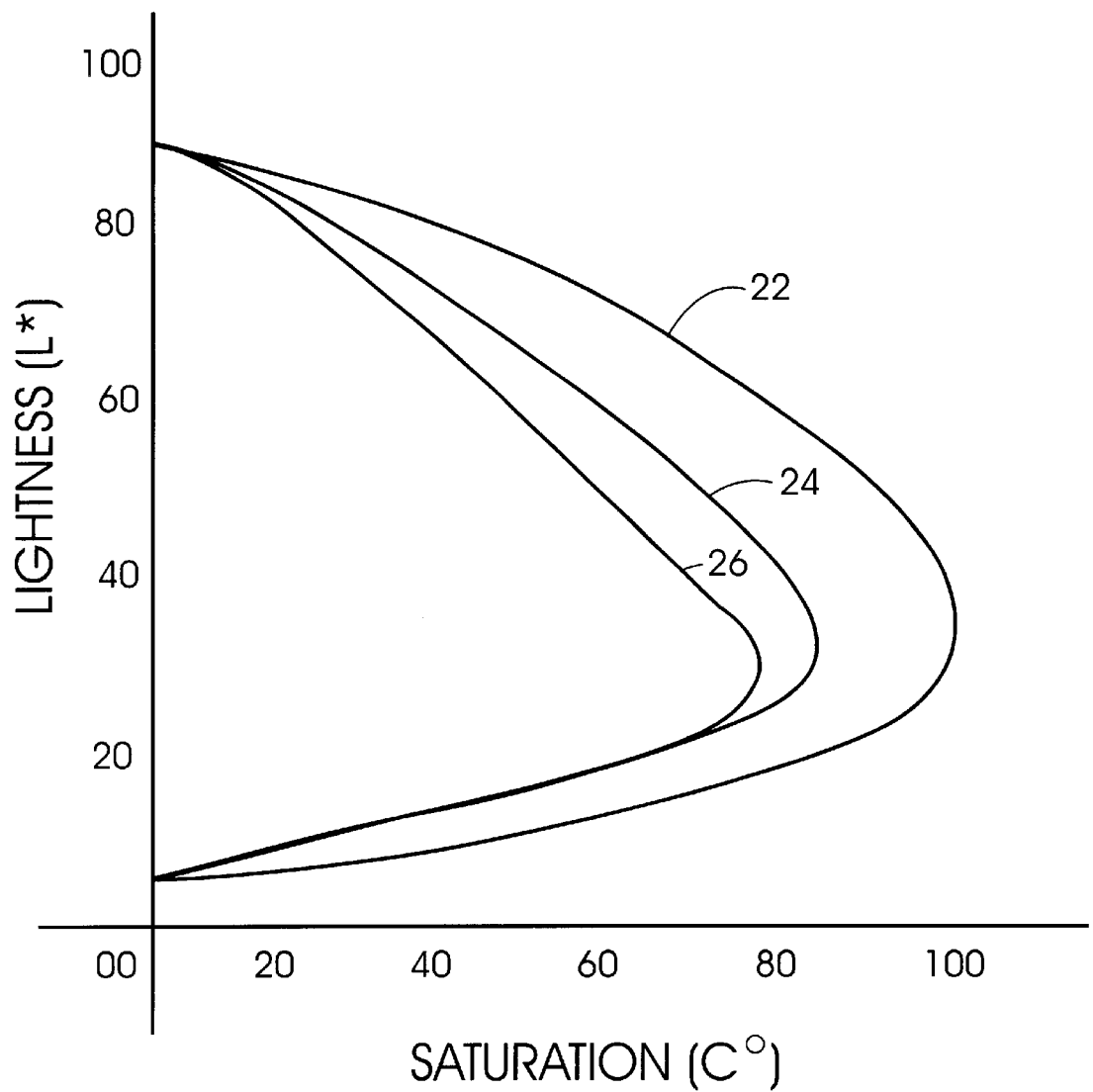
FIG. 5 is the CIELAB color gamuts for pure blue.

Because L* can vary from 0 to 100 and a* and b* can individually range from 0 to 100, one might think that the entire L*a*b* three-dimensional space of 100×100×100 would be accessible to real colors. However, L* and a* and b* are not independent variables as they might first appear. Consider a gemstone that is colorless and completely transparent with L*=100 and C=0. As color is added to the gemstone, C will increase. However, at the same time the added color will reduce the transparency of the specimen so that L* will decrease. Consequently, not all of the L*a*b* three-dimensional color space is accessible because of this dependency of L* on a* and b*. Hence, in real gemstones, or indeed in any color medium, both the maximum color saturation and the maximum transparency are limited by each other. FIG. 5 (FIG. 7.7 from *Collecting and Classifying Diamond*, by Stephen C. Hofer, Ashland Press (New York, 1998), ISBN 0-9659410-1-0) shows with three curves (Theoretical Limit Curve 22, Transparent Gamut Curve 24, and Opaque Gamut Curve 26) that illustrate, respectively, the dependency of L* and C on each other for a pure blue color (−b*) for an ideal, an opaque, and a transparent color medium. Only color saturations and transparencies depicted by areas to the left of the curves are achievable. For opaque gemstones such as black jadeite, the opaque curve is valid. For transparent gemstones such as blue sapphire, the transparent curve is controlling. The theoretical curve is the ideal maximum combination of L* and C that can be obtained in any medium in any form.

The Best Gemstone Colors

Figure 6:
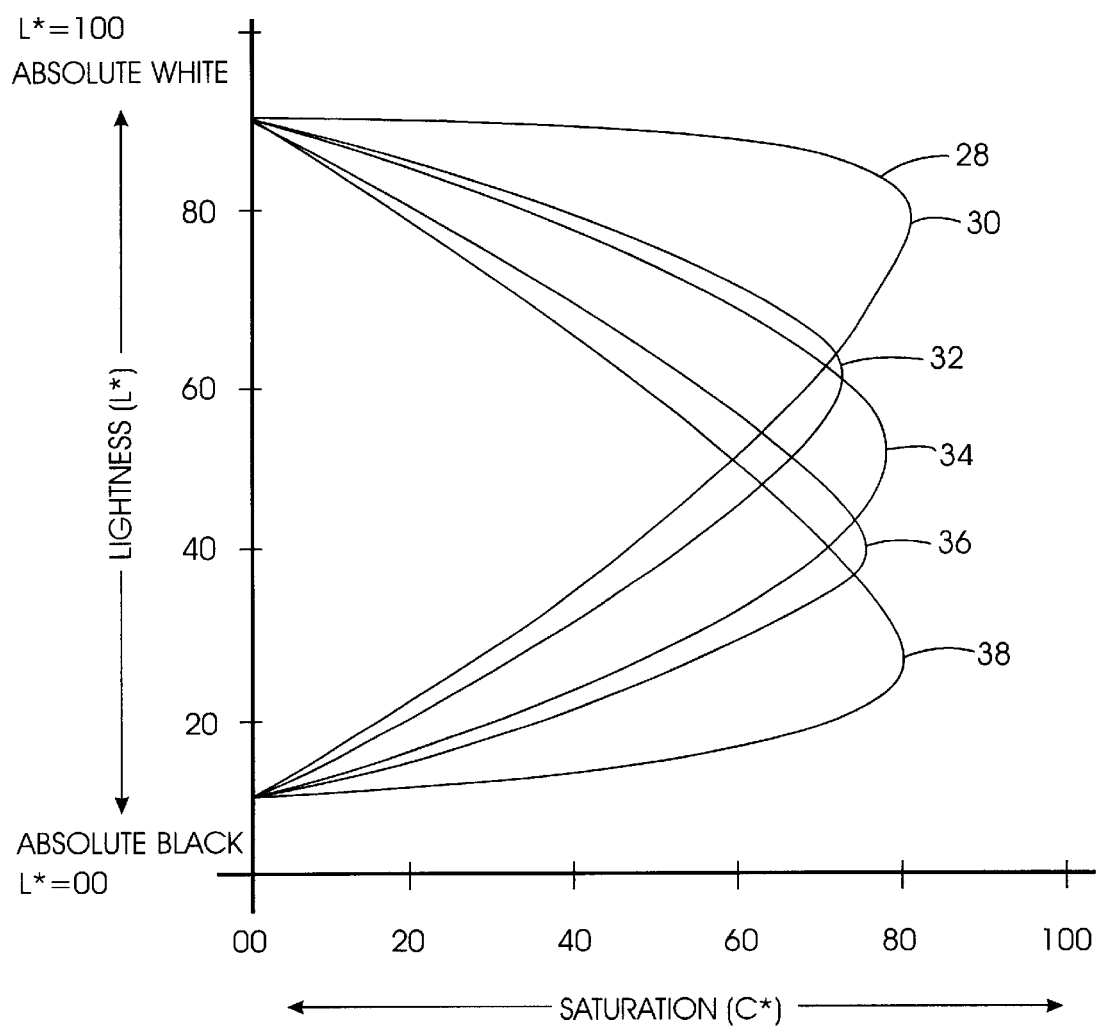
FIG. 6 is the CIELAB typical L-C color gamut saturation curves for yellow, orange, green, red, purple, and blue.

Because the invention is concerned primarily with jadeites, the limitations on L* and C for transparent gemstones of different colors are of the most interest, recognizing that jadeite gemstones are translucent and come in a variety of vivid colors including green, white, yellow to reddish orange, brown, gray, lavender, and reddish-purple which is sometimes referred to as blue. FIG. 6 (FIG. 7.13 from *Collecting and Classifying Diamond*, by Stephen C. Hofer, Ashland Press (New York, 1998), ISBN 0-9659410-1-0) shows typical L*-C saturation curves for yellow 28, orange 30, green 32, red 34, purple 36, and blue 38.

The most spectacular gemstones with the combined maximum vivid color and transparency occupy regions around the right-hand nose of each curve. For example, good green jadeite is in the region with C's between 60–75 and L*'s between 45–75, in the right-hand nose of the green curve. Jadeite with either greater or smaller L*'s or smaller C's will be less appealing to the human eye. Yellow jadeite will have good colors at C's between 65–73 and L*'s between 65–90. Orange jadeite will have good colors at C's between 60–84 and L*'s between 50–90. Purple jadeite will have good colors at C's between 60–75 and L*'s between 30–55. Blue jadeite will have good colors at a C's between 60–82 and L*'s between 15–50. With all the above colors, the maximum possible C compatible with the maximum possible L* in the ranges given above will give the most vivid translucent and best appearing color. For example, theoretically green jadeite will have its best color at C of 73 and L* of 60 just at the nose of the curve shown in FIG. 6. Some jadeite colors are mixtures of the basic colors given above. For example, Imperial Green jadeite is actually a mixture of 63.3% green and 36.7% yellow with a hue angle of 150 degrees. The Imperial Green color will have good colors at C's between 60 to 73 and L*'s between 45–75. The best Imperial Green color will occur at C of 73 and L* of 62.

Table 1 below displays the range of compatible L*'s and C's for the good color range for the various basic colors discussed above for jadeite. In addition, Table 1 gives the compatible L* and C of the best color for each color, i.e., that combination of L* and C that occurs at the right-hand nose of the respective color gamut curves of FIGS. 5 and 6.

TABLE 1

| Color | Good L* Range | Good C Range | Best L* | Best C* |
|---|---|---|---|---|
| Green | 45–75 | 60–75 | 60 | 73 |
| Imperial Green | 45–75 | 60–73 | 65 | 73 |
| Yellow | 65–90 | 65–75 | 85 | 75 |
| Orange | 50–90 | 60–84 | 80 | 82 |
| Purple | 30–55 | 60–75 | 40 | 75 |
| Blue | 15–50 | 60–82 | 26 | 81 |

*Best L* and Best C combinations are not independent, but rather are dependent on each other.

Variation of the Color and Translucency with Gemstone Size

Both L* and C are dependent on the thickness of a gemstone, which has a uniform body color. C will increase with thickness. That is, the color will become more vivid and saturated as the thickness of the gemstone increases. This makes sense since a thicker gemstone has more total color centers than a thin gemstone of the same body color. L* decreases with thickness because the clearness or transparency of the gemstone will decrease with the increasing absorption by color centers or scattering centers in a thicker gemstone. Because light absorption increases exponentially with thickness, one might at first think that L* and C would also vary exponentially with the thickness. However, the human eye also responds in a logarithmic manner to light intensity. This logarithmic response, for example, is one reason that we can see such a wide range of stars in the night sky whose intensities vary by over a factor of one million. The CIELAB diagram was constructed so that equal distances on the diagram correspond to equal changes in visual intensity and color. In other words, the CIELAB diagram is a logarithmic diagram—equal distances correspond to equal ratios in intensities. Hence, both L* and C are logarithmic measures, respectively, of the transparency and color intensity of a gemstone. Although transparency and color intensity do vary exponentially with thickness, the logarithms of the transparency and color intensity, i.e. L* and C values, only vary linearly with thickness X, as follows:

$$C_1 = C_2(X_1/X_2) \quad (4)$$

$$L^*_2 = L^*_1(X_1/X_2) \quad (5)$$

where,

C₁ and C₂ are the colors, and $L^*_1$ and $L^*_2$ are the translucencies, respectively, of gemstones of thickness $X_1$ and $X_2$, having a uniform body color and translucency.

Variation of Color and Translucency with Impurity Concentration.

In a perfect gemstone crystal, the body color, $C_0$, and translucency, $L^*_0$, are linear functions of the concentration, I, of impurity color centers in the gemstone or jadeite:

$$C_0 = \alpha I \quad (6)$$

$$L_0 = \beta 1/I \quad (7)$$

where,

α and β are constants related to the specific impurity and gemstone.

For example, the color of Imperial Green jadeite comes from a small amount of Cr impurity added to the jadeite, $NaAlSi_2O_6$.

Impurity Concentration Versus Thickness for the Optimum Color Gemstones

If one produces a gemstone, or specifically a piece of jadeite, with an optimum translucency and color of L* and C for a given thickness X, how does one vary the impurity concentration, I(X) (where (X) signifies the functional dependency of impurity concentration I on the specimen thickness X), to obtain this same optimum color and translucency for a different thickness? Substitution of Equations 6 and 7 into 4 and 5 while holding C and L* constant, respectively, both give:

$$I(X1)/I(X2) = X1/X2 \quad (8)$$

$$I(X1)/I(X2) = X1/X2 \quad (9)$$

where,

I(X1) and I(X2), respectively, are the impurity concentrations necessary to maintain color and translucency constant at gemstone thicknesses X1 and X2.

Fortunately, both equations give the same answer. One can see from Equations 8 and 9 that it is possible to obtain the exact same apparent color and apparent translucency in gemstones of varying sizes if one changes the intrinsic body color and transparency with size. For example, if one doubles the thickness of a jadeite gemstone, one must halve the impurity concentration to maintain the same color C and same translucency L*. Consequently, the composition of a jadeite glass used as the precursor to grow jadeite is only optimized for one gemstone size (i.e., thickness). As the desired gemstone size is changed, the impurity concentration of the precursor glass also must be changed to maintain the same color C and translucency L*. For example, to make Imperial Green jadeite for a cabochon that will be 3 mm thick requires the concentration of Cr to be 0.25 weight-%. To make the same Imperial Green jadeite color and translucency in a cabochon that is 6 mm thick, a precursor glass with only half the concentration of Cr concentration, i.e., 0.12 weight-%, is required (Equations 8 and 9).

Table 2 tabulates the approximate wholesale value (US Dollars per carat, as estimated by a recognized gemological laboratory) and L*a*b* and C indices, as well as an overall Pythagorean-weighted translucency-color L*C vector for the gemological samples. Because L* follows Lambert's relationship for thickness and transparency, these natural "Imperial" jadeite samples all had maximum thickness between 2 and 3 mm. Other color space measurement systems are recognized and can be correlated (technically equivalent) with the CIELAB measurements.

TABLE 2

Natural Jadeite Gems

| Sample | $/carat | L* | a* | b* | C | L*C Vector $(L^{*2} + C^2)^{(1/2)}$ |
|---|---|---|---|---|---|---|
| 1 | 7000 | 63.4 | −55.8 | 33.7 | 65.19 | 90.94 |
| 2 | 2800 | 66.5 | −49.6 | 31.9 | 58.97 | 88.88 |
| 3 | 1000 | 69.8 | −51.1 | 35.6 | 62.28 | 93.55 |
| 4 | 800 | 74.6 | −28.4 | 19.7 | 34.56 | 82.22 |
| 5 | 250 | 59.1 | −37.1 | 27.4 | 46.12 | 74.97 |

The overall progression in the Table 2 places the highest values on large L*, i.e., high translucency, and large negative a*, i.e., intense green, and moderately high b*, i.e., added yellow. It appears that a* is the most important variable followed by b* in valuing a jadeite gem. Sample 3 is generally out of order and appears to have been incorrectly valued based on color and translucency alone. Other factors, such as inclusions or cracks, may have decreased Sample 3's value from what one might have expected based only on its color and translucency.

Figure 7:
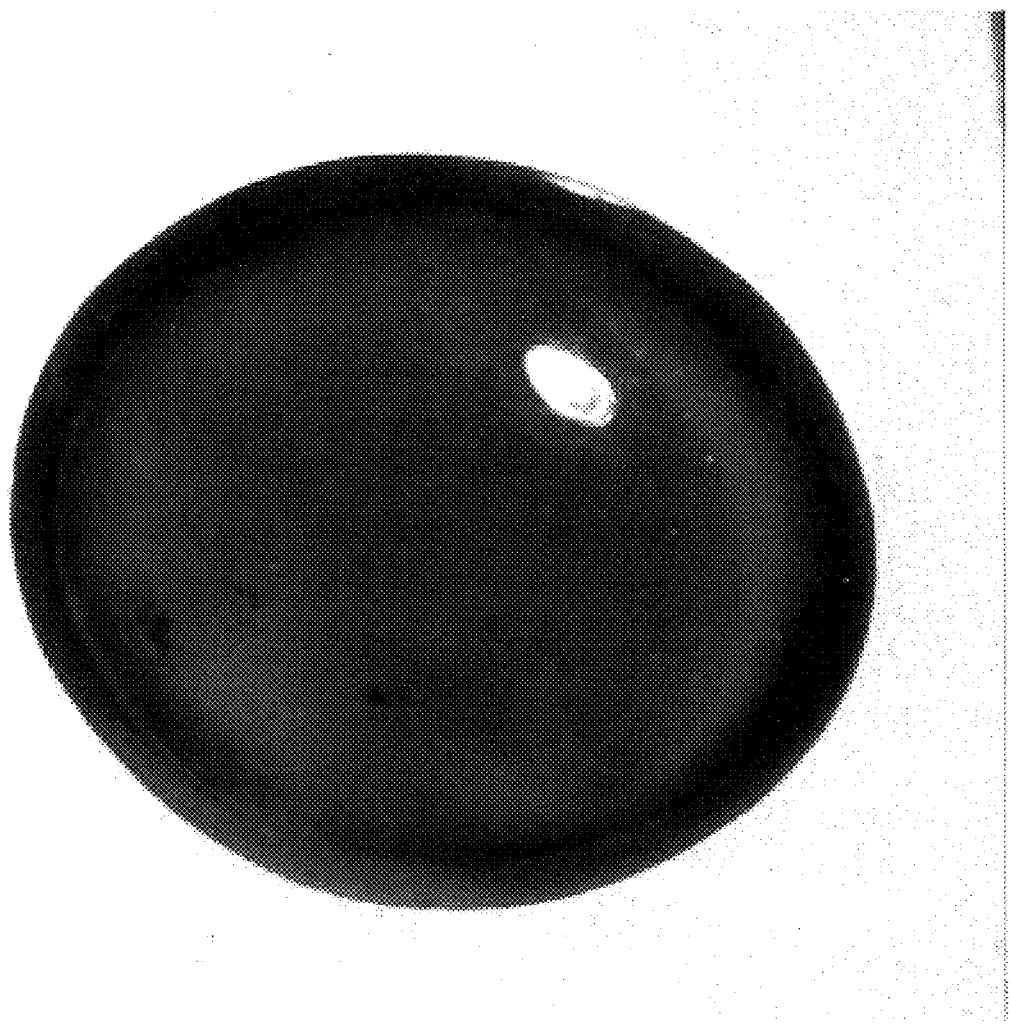
FIG. 7 is a photograph of natural "Imperial" grade jadeite (Sample 1)

Even the least valuable of these gems exhibits a high degree of translucency and highly saturated green color. Inspection of these and other gems reasonably provides a CIELAB specification for "Imperial" jadeite. Jadeite minerals meeting the CIELAB specification discussed above generally will provide the visual impression of "Imperial" jadeite. More translucent and more saturated examples will carry higher values. Surface finishes on the inventive gems are less than 5 micro inch arithmetic average roughness to minimize scattering. FIG. 7 is a photograph of sample number 1 of natural jadeite. Comparison of FIG. 7 to FIG. 1 shows why previous synthetic jadeites were not considered "Imperial" quality. Note that the natural jadeite in FIG. 7 exhibits small dark inclusions, non-uniform color, and is nearly transparent.

Figure 8:
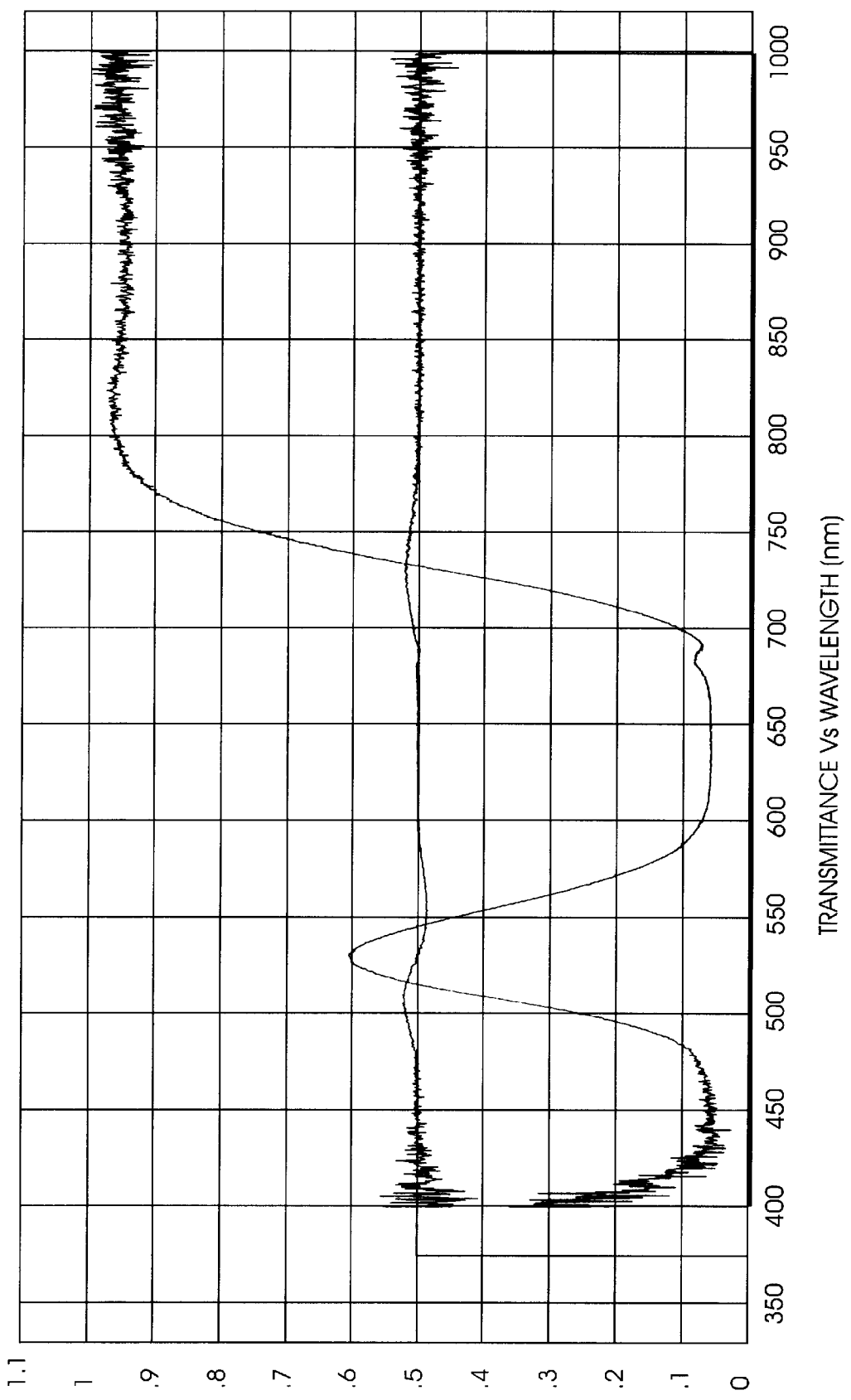
FIGS. 8 and 9 are continuous transmission spectra of two different natural jadeite gems describe in Table 1, below.
Figure 9:
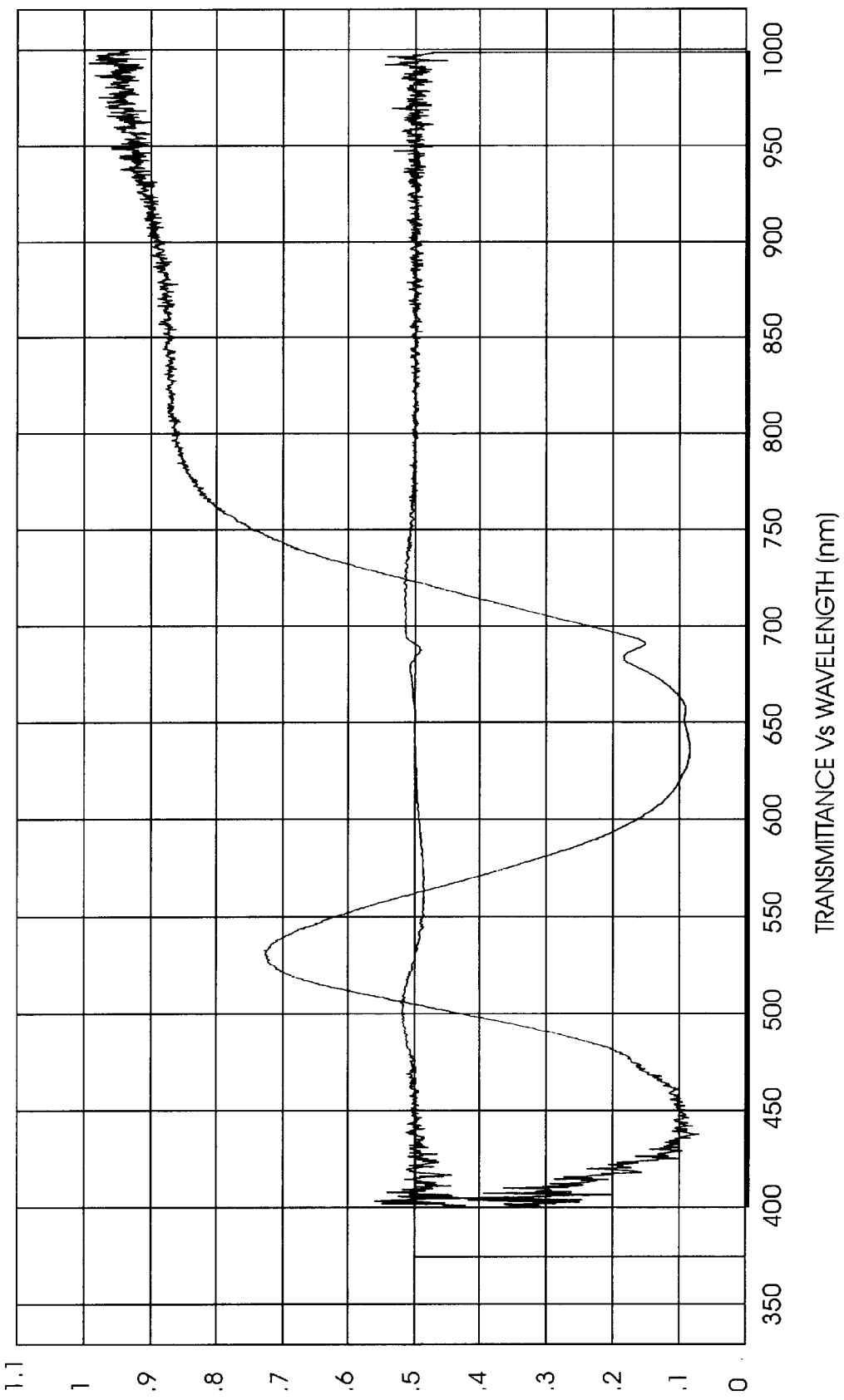

The SAS2000 calorimeter also produces continuous transmission spectra of these gem materials. Spectra for the most valuable gems (Samples 1 and 2 in Table 1) are FIGS. 8 and 9. Both gems have a transmission peak centered at a wavelength of about 530 nm. Sample 1 has a narrower transmission peak, a half height width between about 510 and 565 nm correlating with an intense green color. Less valuable pieces exhibit less transmission and broader transmission bands.

A sample of prior art jadeite was obtained from Dr. DeVries (see DeVries, et al., *GE Technical Information Series, supra*) and characterized for color indices. The sample was in the form of semi-polished cabochon with thickness of 2.0 mm and color measurements of L*=41.0, a*=−5.1, b*=4.8. The sample did not visually exhibit the translucency or color saturation required of "Imperial" grade material. The sample also had lower density of 3.26 g/cc.

The prior art jadeite of Zhou, et al. was reproduced using a chromium doped glass, crushed to −60/+100 mesh size powder. The powder was loaded into a high-pressure cell and sintered at 5.2 GPa and 1575° C. for 1 hour. A sintered compact was obtained having a density of 3.28 g/cc, indicating successful conversion to jadeite. The compact was polished to 4-mm thickness. The colorimeter measurements were: L*=32.3, a*=−2.8, and b*=3.2. This sample did not achieve any of the CIELAB index specification requirements.

Figure 10:
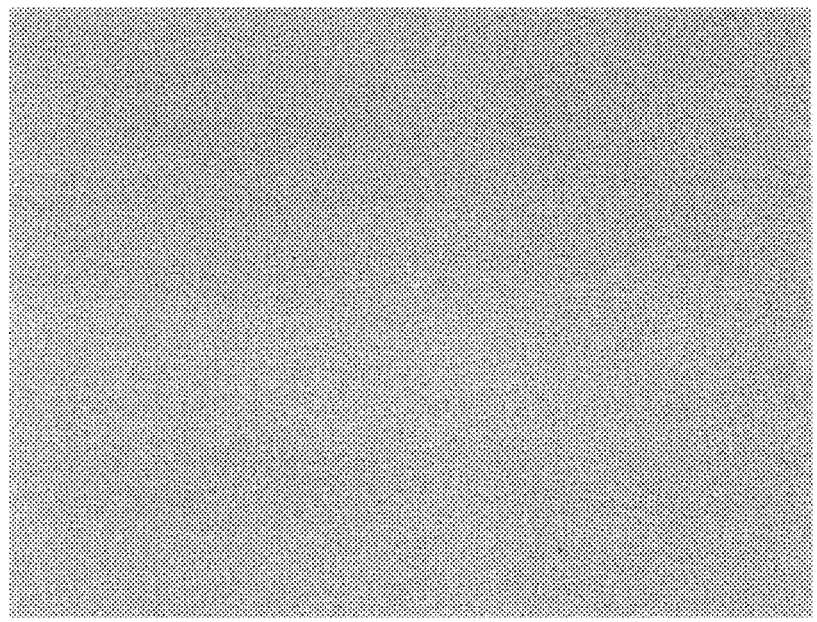
FIG. 10 is a 500× photomicrograph of a polished section of the inventive jadeite as reported in Example 1.

A jadeite sample of the present invention was produced from a glass with stoichiometric jadeite composition of $NaAlSi_2O_6$ containing 0.17 wt-% of $Cr_2O_3$ (see Example 1 below). A final density of 3.30 g/cc indicated successful conversion to the jadeite phase. Unlike prior art "synthetic" jadeite, a polished section of this material was completely featureless at 500×. The complete absence of gross or intergranular cracks, or non-uniform color distributions, or second phases is shown in FIG. 10. The colorimeter measurements of this sample were: L*=61.2, a*=−55.1, and b*=31.8.

The similar transparency and color saturation of valuable natural jadeite gems and the examples cited in this application may be quantitatively presented in L* and C space, as described above. Fitting the theoretical L*,C space to contain the natural "Imperial" samples cited above permits a quantitative assessment perfection achieved by the invention with respect to natural gems and prior art. As shown in FIG. 10a, the right hand nose (or theoretical L*,C limit) is nearly achieved by both valuable gems and the examples of the inventions. The substantially lower translucency and color saturation of the prior art is obvious from in FIG. 10a.

Figure 11:
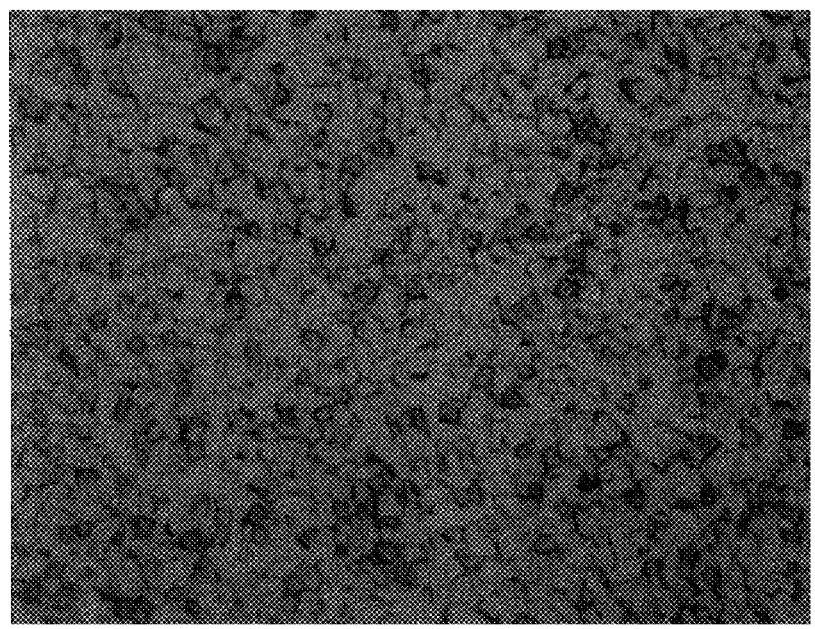
FIG. 11 is a 1000× photomicrograph of an acid-etched section of the inventive jadeite as reported in Example 1.
Figure 12:
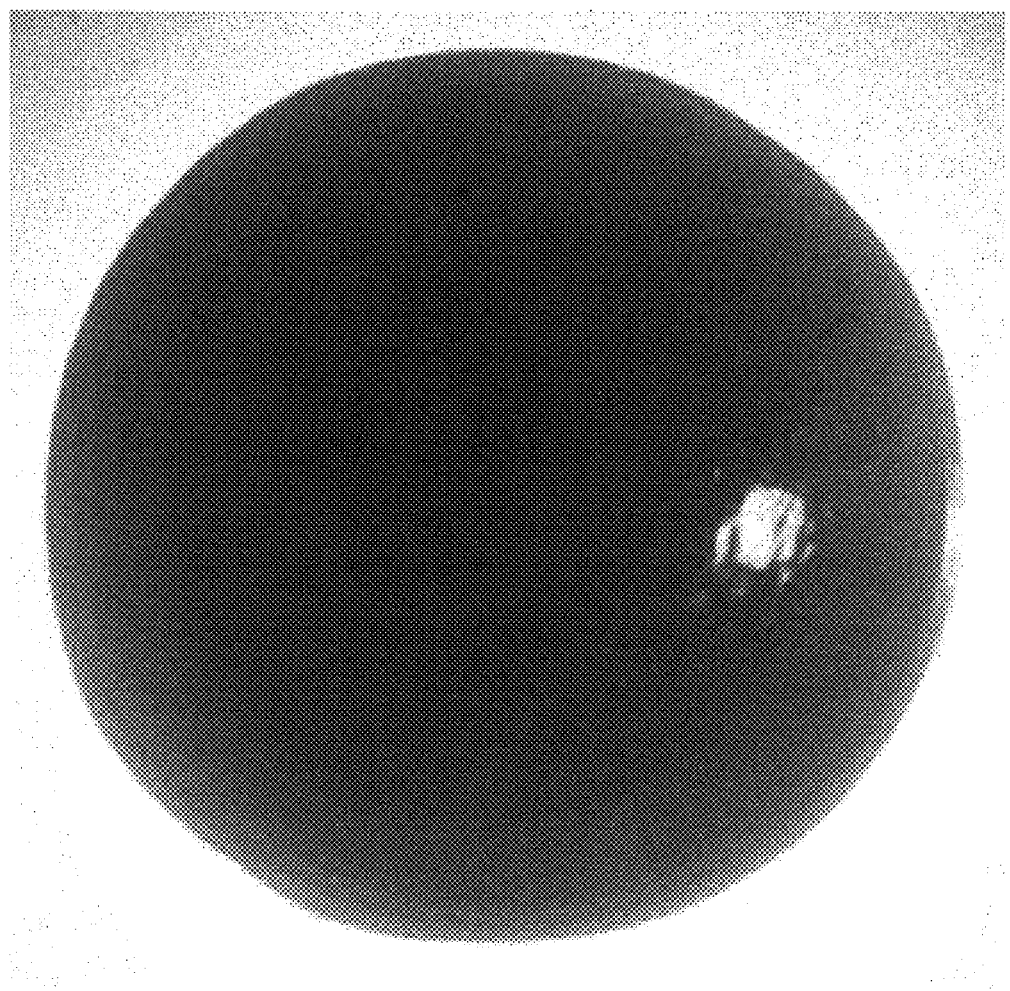
FIG. 12 is a photograph of the inventive jadeite as manufactured in Example 1.

Acid etching highlights the grain structure of this jadeite material as can be seen by viewing FIG. 11 at 1000× magnification. This sample has an average grain size of 2 microns. The maximum grain size is approximately 5 microns. The grains are relatively equiaxed, without the elongation noted in prior art jadeite samples. These very fine, uniform grains provide a simple, reliable method of detecting this man-made material. No second-phase artifacts over the 2-micron grain size, cracked grain boundaries, or pullouts are evident. Triple points, if present at all, are smaller than the 2-micron grain size. The SAS calorimeter measurement yielded the following values: L*=60.2, a*=−55.5, and b*=31.7. This material has significantly higher translucency and color saturation than prior art. It falls well within the gem grade attributes in Table 1. This gem is shown in FIG. 12. Note should be taken that this synthetic jadeite exhibits no inclusions, displays a uniform color, and is translucent. The inventive synthetic jadeite in FIG. 12 should be compared to the natural jadeite sample in FIG. 11 and the prior art jadeite samples in FIG. 1.

Figure 13:
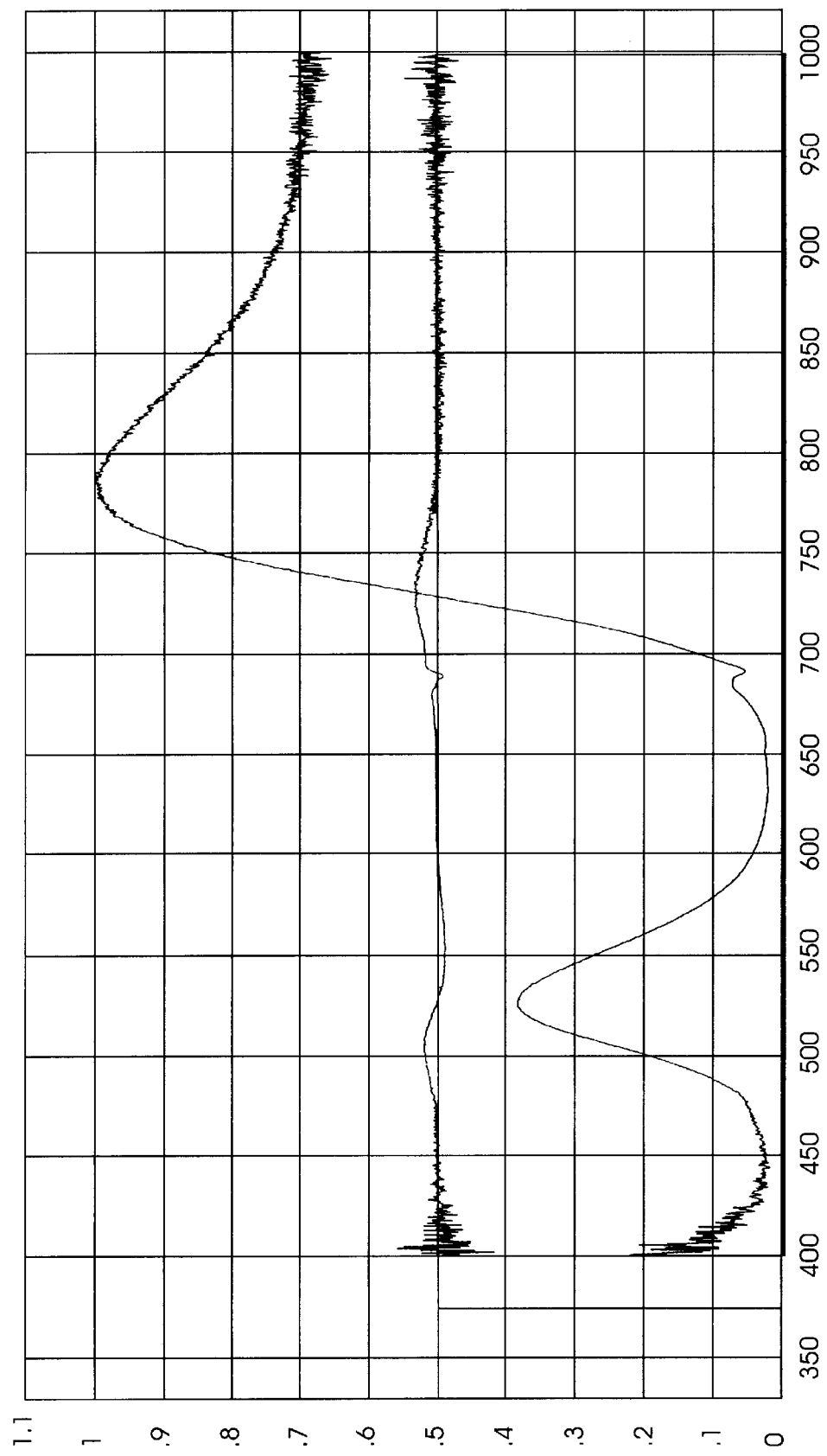
FIG. 13 is a continuous transmission spectrum for the inventive jadeite sample of Example 1.

Finally, the transmission spectrum of this sample closely mimics the natural materials. The peak transmission was 530 nm with a half height width between 500 and 565 nm, as can be seen by reference to FIG. 13. Additionally, the coloration is uniform with no mottling observed up to 200×. None of the lamellar cracking, surface reflections (adventuresence) or polishing defects so evident in prior art jadeite were present in this sample in particular (again, see FIG. 12) and not in most samples in general.

The uniform grain size and hardness of the inventive jadeite product make it easier to polish than prior art or natural jadeite material. It is known that natural jadeite must be carefully polished to prevent "undercutting," or micro scale topography resulting from preferential polishing of oriented jadeite crystals or second phases. Recall that waxes hide these problems in natural gems. Prior art jadeite material also exhibits undercutting. The surface finish achieved on the inventive jadeite was less than 3 micro inches Ra. With such a smooth finish, waxes are not needed, and a more stable, durable product is produced.

To assess product reliability, the process of Example 1 was repeated. The color indices on several samples met the "Imperial" specification range. The observed colorimetric values were as follows: L* was between 55 and 65, a* was between −53 and −56, and b* was between +30 and +33. Grain size, finish, and microstructure features were identical to the sample reported in Example 1. A continuous spectrum of this duplicate sample also closely mimics natural material, peaking at 525 nm with a half height width of 500 to 565 nm.

The L*a*b* values of the natural gem-grade jadeite prior art and inventive samples reported herein are summarized in Table 3, below.

TABLE 3

L*a*b*C Summary

| Jadeite | L* | a* | b* | C | $(L^2 + C^2)^{1/2}$ |
|---|---|---|---|---|---|
| Example 11 | 65.9 | −61.5 | 37.5 | 72.0 | 97.61 |
| Example 9 | 68.9 | −57.1 | 31.9 | 65.4 | 95.00 |
| Example 7 | 68.0 | −56.3 | 32.6 | 65.1 | 94.14 |
| Example 2 | 59.9 | −56.1 | 31.8 | 64.49 | 88.01 |
| Example 8 | 68.3 | −55.8 | 31.9 | 64.3 | 93.81 |
| Sample 1* | 63.4 | −55.8 | 33.7 | 65.19 | 90.93 |
| Example 1 | 61.2 | −55.1 | 31.8 | 63.62 | 88.28 |
| Example 3 | 60.4 | −55.1 | 31.5 | 63.47 | 87.62 |
| Example 10 | 66.9 | −54.8 | 32.8 | 63.9 | 92.51 |
| Sample 3* | 69.8 | −51.1 | 35.6 | 62.28 | 93.54 |
| Sample 2* | 66.5 | −49.6 | 31.9 | 58.97 | 88.88 |
| Sample 5* | 59.1 | −37.1 | 27.4 | 46.12 | 74.97 |
| Sample 4* | 74.6 | −28.4 | 19.7 | 34.56 | 82.22 |
| DeVries** | 41.0 | −5.1 | 4.8 | 7.00 | 41.59 |
| Zhou** | 32.3 | −2.8 | 3.2 | 4.25 | 32.58 |
| Comparative Example 4** | 32.3 | −2.8 | 3.2 | 4.25 | 32.58 |

*Natural Imperial Jadeite
**Prior Art

This tabulated data (sorted by a*) in Table 3 should be compared to the values determined for a jadeite sample to be termed "Imperial" grade, i.e., an L* index exceeding 42, an a* value of less than −6, and a b* value that exceeds 6, with the preferred L*a*b* region being around >60, <−50, >30, respectively. It will be observed that the only jadeite samples that meet these criteria are the natural jadeite samples and the inventive jadeite samples reported in the Examples. In fact, none of the prior art samples have any L*a*b* value within the range suggested for "Imperial" jadeite. Such uniqueness of values, coupled with its other properties, underscores the novelty of the inventive jadeite.

The index of refraction of the novel jadeite material ranges from about 1.655 to 1.659±0.002. Such values were taken on polished (4000 grit paper) facets (4×4 m) using monochromatic light.

Other Jadeite Colors

In addition to imperial Green jadeite induced by Cr impurities, and lavender or magenta jadeite induced by Mn impurities, other desirable colors include, inter alia, clear stoichiometric jadeite without any impurities and black jadeite with high impurity concentrations of Cr or Fe.

Rare earth elements can be added to stoichiometric jadeite to produce a wide range of colors. The color imparted by rare earth elements is largely independent of their site or neighbors in jadeite. The colors of these elements are derived from electronic transitions within the inner f shell, which is shielded from the surrounding ions and ligand fields by the outer 5s25p6 completely filled shell in all the rare earths, which is the reason for the almost identical chemical nature of all of the rare earth elements. The following table gives the rare earth element, their f shell configuration and the color imparted to the jadeite by the rare earth element. Concentrations of the rare earth element should be in the range of just above 0 to about 1 mol-%.

TABLE 4

| Element | Trivalent Ion F-Shell | Color |
| --- | --- | --- |
| La | 4f0 | Colorless |
| Ce | 4f1 | Yellow to Colorless |
| Pr | 4f2 | Green |
| Nd | 4f3 | Lilac, pink |
| Pm | 4f4 | Pink, Yellow |
| Sm | 4f5 | Pale Yellow |
| Gd | 4f7 | Colorless |
| Tb | 4f8 | Pink |
| Dy | 4f9 | Pale Yellow |
| Ho | 4f10 | Pink, Yellow |
| Er | 4f11 | Lilac, Pink |
| Tm | 4f12 | Green |
| Yb | 4f13 | Yellow, Colorless |
| Lu | 4f14 | Colorless |

Opaque White Jadeite

In addition to these colors there is sometimes a demand for opaque white jadeite. This can be produced by one of the following methods:

Method I

Add an extra 0.5 to 1 mol-% $Al_2O_3$ to the stoichiometric jadeite and anneal for several hours during crystallization to cause precipitation of very fine $Al_2O_3$ precipitates.

Method II

Figures 15A, 15B, 15C:
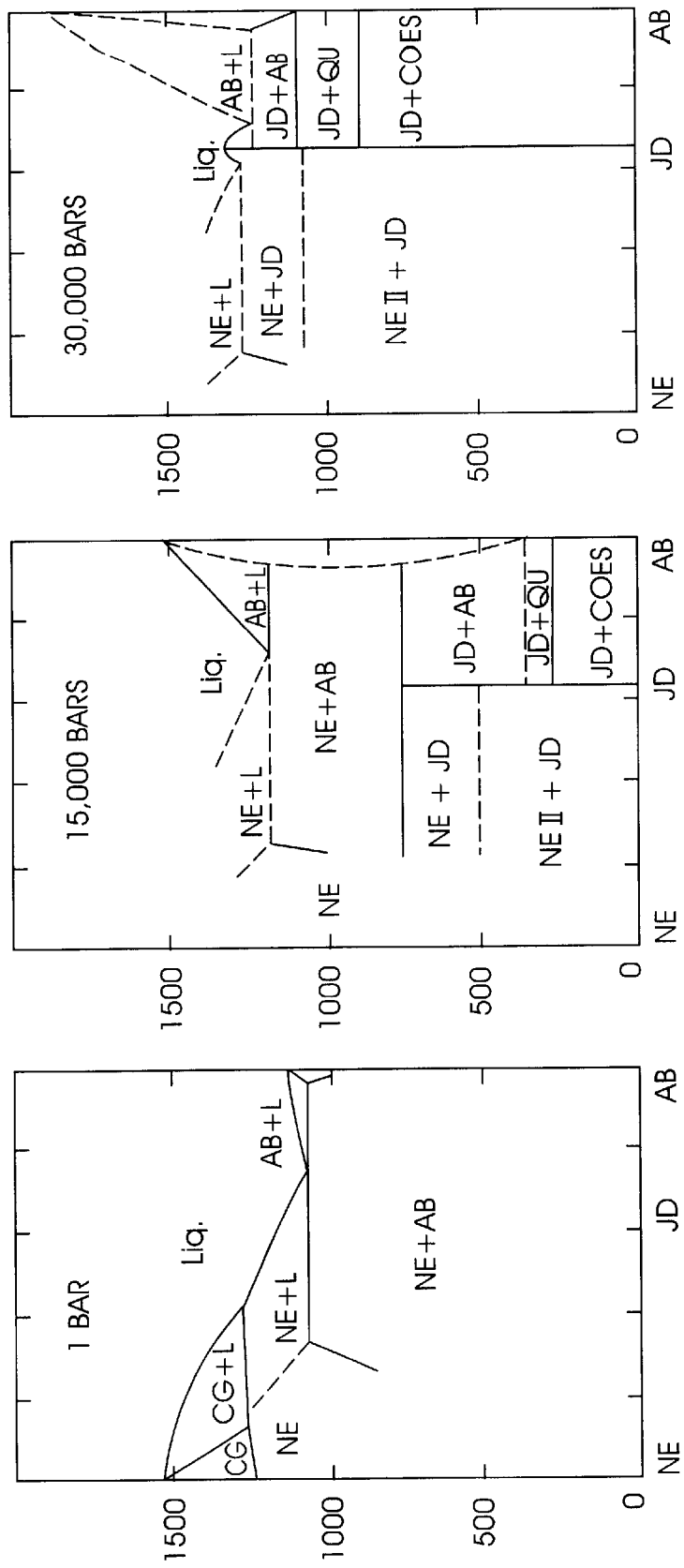
FIGS. 15A, 15B, and 15C are phase diagrams for $NaAlSiO_4$–$NaAlSi_3O_6$ at various temperatures and pressures.

A stoichiometric jadeite crystal with no added impurity is annealed at a temperature below the liquidus region (see FIGS. 15A, 15B, and 15C) for a short period of time to cause a precipitation of a small amount of microscopic nepheline ($Na_2O \cdot Al_2O_3 \cdot 2SiO_2$) and/or albite ($Na_2O \cdot Al_2O_3 \cdot 6SiO_2$). Rayleigh scattering from these microscopic precipitates causes the jadeite to be milky white in color. The optimum anneal time will increase with decreasing temperature because the kinetics of diffusion decrease exponentially with temperature. Note that the liquidus temperature varies somewhat with pressure. It is most convenient to anneal the jadeite at atmospheric pressure where the liquidus is at approximately 1050° C.

Blue Jadeite

Figure 16:
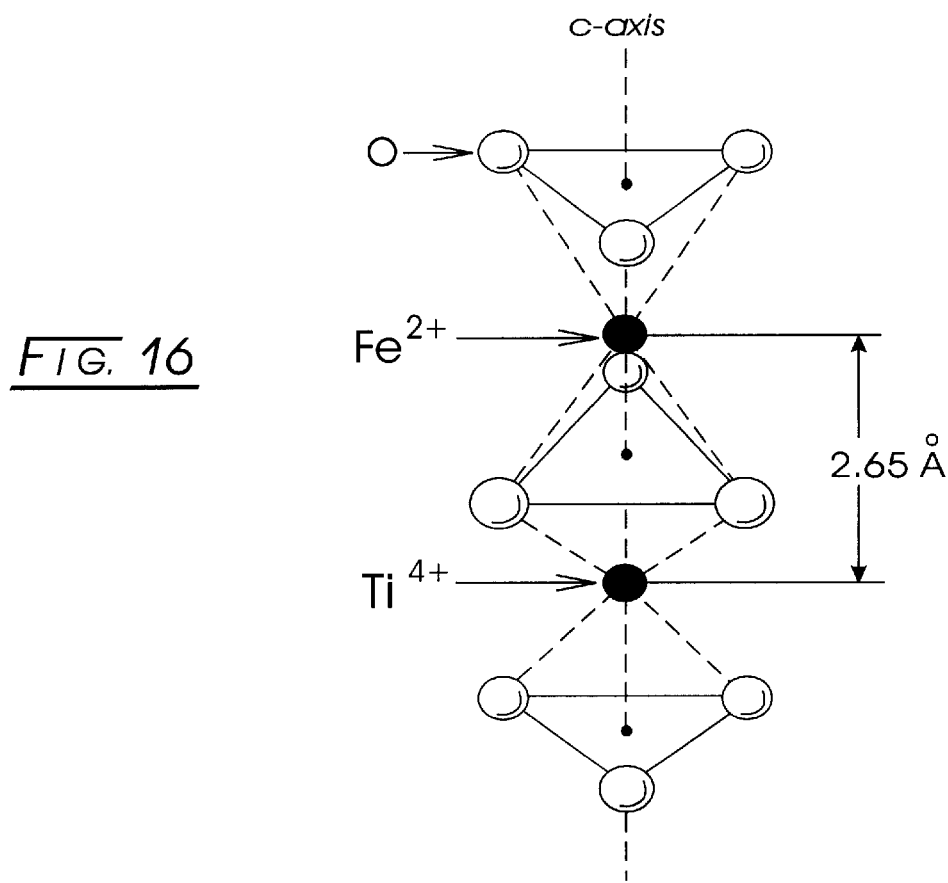
FIG. 16 is partial chemical configuration of natural jadeite with $Fe^{+2}$ and $Ti^{4+}$ replacement for producing a blue jadeite material.

True Blue Jadeite has not yet been found in nature (there is a natural reddish-purple, however, that often is referred to as "blue"). To produce blue jadeite, 0.05 mol-% Ti and 0.05 mol-% Fe should be added to stoichiometric jadeite. Fe and Ti will replace Al in the distorted octahedron of 6 oxygen atoms in the jadeite structure. This is the same replacement that occurs when $Cr^{+3}$ replaces Al in jadeite to give an Imperial Green color. $Fe^{+2}$ and $Ti^{+4}$ will be present and an interaction between them is possible when they are on adjacent octahedral sites sharing faces in the c-direction (see FIG. 16 adapted from *The Physics and Chemistry of Color*, by K. Nassau, p. 142, John Wiley & Sons, NY (1983)).

When the Fe and Ti are on neighboring sites, there is sufficient overlap of the dz2 orbitals of these ions that with a light absorption assist, an electron can pass from $Fe^{+2}$ to $Ti^{+4}$, as follows:

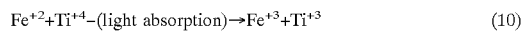

$$Fe^{+2} + Ti^{+4} - (\text{light absorption}) \rightarrow Fe^{+3} + Ti^{+3} \quad (10)$$

Figure 17:
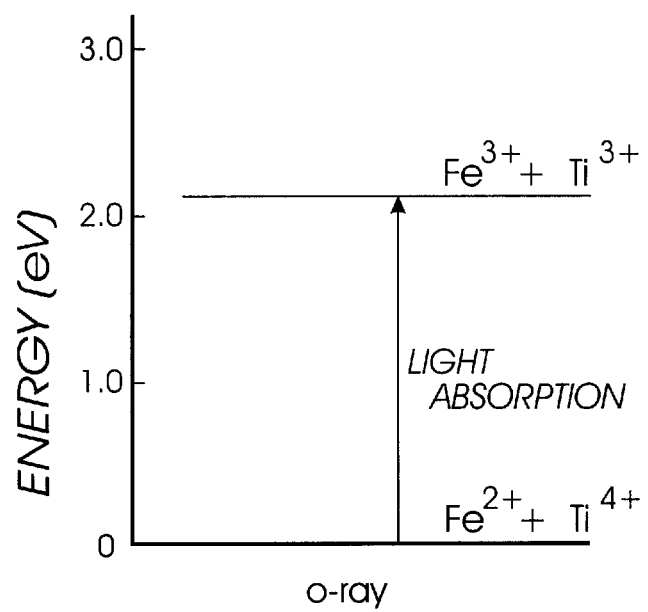
FIG. 17 is an energy diagram of the jadeite material of FIG. 16 showing that light absorption causes a broadband absorbance centered at 588 nanometers, thereby coloring the crystal blue.

The accompanying light absorption causes a broadband absorbance centered at 588 nanometers, thereby coloring the crystal blue (FIG. 17 adapted from *The Physics and Chemistry of Color*, K. Nassau, p 142, John Wiley & Sons, NY (1983)).

Orange Color

To produce an orange jadeite, 0.1 mol-% Cr+0.1 mol-% Mg should be added to the jadeite. Each $Mg^{+2}$ and $Cr^{+3}$ ion will replace an $Al^{+3}$ ion in the jadeite. If Cr and Mg occupy adjacent octahedrons, Cr will enter the rare Cr(IV) state with one $Mg^{+2}$ ion and one $Cr^{+4}$ ion taking the place of two $Al^{+3}$ ions and, thereby, producing a charge-neutral crystal. The $Cr^{+4}$ ion will produce an orange color in the $Al_2O_3$ octahedral site in jadeite.

Other Elemental Substitutions

The M2 Na+[8] Site

To improve the quality, translucency, grain size or color of the jadeite or to enhance the manufacturability of the precursor glass, it may be useful to partially substitute other elements or combinations of other elements in the jadeite structure for the Na and Al atoms. For example, the partial substitution of certain elements for Na or Al may lower the melting point of the precursor glass and allow a more homogeneous glass to be formed. Successful substitution of elements or combinations of elements in the jadeite structure is dependent on these elements satisfying Pauling's charge neutrality and size rules (C. Klein & C. S. Hurlbt, *Manual of Mineralogy*, 21$^{st}$ Edition, p. 197, John Wiley & Sons, NY, N.Y. 1993). Na occupies an irregular polyhedron with eight-fold coordination in the jadeite crystal as a singly charged ion with eight oxygen nearest neighbors called the M2 site. In geology nomenclature, this is signified by Na+[8]. Other alkali metals can be substituted for Na. For example, a mixture of 42 mol-% $K^{+1}$ and 58 mol-% $Li^{+1}$ can partially replace an equal molar amount of $Na^{+1}$ in jadeite without causing lattice strain or violating charge neutrality. If 10% of the Na were replaced with this mixture, the jadeite would have the composition:

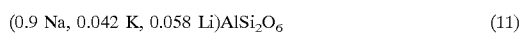

$$(0.9\ Na,\ 0.042\ K,\ 0.058\ Li)AlSi_2O_6 \quad (11)$$

Another possible substitution for Na+[8] is a mixture of 16 mol-% $K^{+1}$ and 84 mol-% $Ca^{+2}$ for $Na^{+1}$. This partial substitution would not cause lattice strain, but would result in an unbalanced charge in the lattice because Ca is a doubly charged ion. This unbalanced charge on Na sites would have to be compensated for by substituting a singly or doubly charged ion for the triply charged Al on the Al sites. For example, $Mg^{+2}$ can be substituted for $Al^{+3}$. If 10% of the Na atoms were replaced with a mixture of 16 mol-% $K^{+1}$ and 84 mol-% $Ca^{+2}$ and a charge compensating amount of $Mg^{+2}$ was partially substituted for the $Al^{+3}$, the jadeite would have the composition:

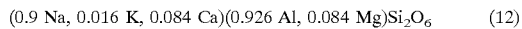

$$(0.9\ Na,\ 0.016\ K,\ 0.084\ Ca)(0.926\ Al,\ 0.084\ Mg)Si_2O_6 \quad (12)$$

This jadeite composition will be unstrained and charge neutral.

The M1 $Al^3+[6]$ Site

Triply charged Al ions occupy the M1 octahedral site in jadeite with six nearest neighbor oxygen atoms and are designated as $Al^3+[6]$. Various mixtures of elements can be partially substituted for the Al ions in jadeite without causing any lattice strain and without violating charge neutrality. For example, a mixture of 72 mol-% of $Mn^{+3}$ and 28 mol-% $B^{+3}$ can be substituted for an equal molar amount of $Al^{+3}$ on the M1 sites in jadeite. If 10% of the Al ions were replaced, the resulting jadeite would have the following composition:

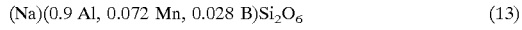

$$(Na)(0.9\ Al,\ 0.072\ Mn,\ 0.028\ B)Si_2O_6 \quad (13)$$

Other mixtures that can partially substitute for Al include: (1) 72 mol-% $Fe^{+3}$ and 28 mo-% $B^{+3}$; (2) 78 mol-% $Cr^{+3}$ and 22 mol-% $B^{+3}$; (3) 56 mol-% $Sc^{+3}$ and 44 mol-% $B^{+3}$; (4) 56 mol-% $Ti^{+4}$ and 44 mol % $Be^{+2}$.

In addition, mixtures that do not preserve charge neutrality can be substituted on the $Al^{+3}$ M1 sites provided that overall charge neutrality is secured by a parallel charge-cancellation substitution on the Na+[1] M2 sites. For example, a mixture of 55 mol-% $Fe^{+2}$ and 45 mol-% $B^{+3}$ can be substituted on the $Al^{+3}$ M1 site if a charge cancellation substitution of $Mg^{+2}$, $Ca^{+2}$, $Ba^{+2}$, or $Be^{+2}$ is made on the $Na^{+1}$ M2 site. Hence, if this mixture replaces 10% of the Al ions, the resulting jadeite would have the following composition:

$$(0.955\ Na, 0.055\ Ca)(0.9\ Al, 0.05\ 5Fe, 0.045\ B)Si_2O_6 \quad (14)$$

Other mixtures that can partially substitute for Al but which require charge cancellation substitution on Na sites include: (1) 64 mol-% $Ni^{+2}$ and 36 mol % $B^{+3}$; (2) 55 mol-% $Co^{+2}$ and 45 mol % $B^{+3}$; (3) 26 mol-% $Fe^{+2}$ and 74 mol-% $Be^{+2}$; (4) 31 mol-% $Co^{+2}$ and 69 mol-% $Be^{+2}$.

It is interesting to note that the most common substitution in Imperial Green jadeite is $Cr^{+3}$ for $Al^{+3}$ and that this substitution is not strain free. A strain-free Imperial Green jadeite should substitute a mixture of 78 mol-% $Cr^{+3}$ and 22 mol-% $B^{+3}$ for $Al^{+3}$. For example, if this mixture replaced 1% of the $Al^{+3}$ ions, the Imperial Green Jadeite would have the following composition:

$$(Na)(0.99\ Al, 0.0078\ Cr, 0.0022\ B)Si_2O_6 \quad (15)$$

This jadeite is charge neutral and strain free. Dissolution of Cr into this lattice is easier than dissolution of Cr alone into stoichiometric jadeite, i.e., $NaAlSi_2O_6$.

The absence of lattice strain also affects the grain size of jadeite recrystallized from the glass by reducing atomic nucleation and growth barriers.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

EXAMPLES

In the Examples

A glass (designated as Y72 with an index of refraction of 1.49742) was melted with a stoichiometric composition of $NaAlSi_2O_6$ and containing 0.17 wt-% of $Cr_2O_3$ and then cast in the form of an ingot. Cylindrical samples with 0.410" diameter and 0.400" height were produced from the glass ingot. The cylindrical glass piece was wrapped all around first with single or multiple layers of 0.002" thick tantalum foil and then with single or multiple layers of 0.015" thick Grafoil®. The sample then was placed into a pre-formed pill made of high-purity graphite, sodium chloride, aluminum oxide, or hexagonal boron nitride powder; and loaded in high-pressure cell. Graphite powder is preferred because it is easier to form the pills and it does not melt during high-pressure run.

The cylindrical glass samples were annealed over a wide range of pressure (3 to 6 GPa), temperature (1000° to 1800° C.), and time (5 to 120 minutes) conditions using a cell design as illustrated and described for FIG. 2. Typically, the process starts with the reaction cell being pressurized to a set pressure of ~5.5 GPa. The electrical power was turned on when the pressure reached ~96% of the set pressure. Initially, the glass sample was heated to 700° C. and held there for one minute. Thereafter, the temperature was increased to the set value in eight minutes and held at the set value for approximately one hour, after which the temperature was reduced to 200° C. over seven minutes. The pressure was reduced simultaneously from the maximum set pressure to 3.5 GPa, at which time the heating power was turned off. The cell pressure was held constant for two minutes and then slowly released. The reaction cell was removed from the high-pressure apparatus and jadeite sample recovered by mechanically removing the tantalum and Grafoil layers. It was found that both slow cooling and release of pressure significantly helped in reducing cracking and delamination of jadeite sample.

The samples were analyzed for jadeite phase by X-ray diffraction, Raman Scattering, FTIR Infrared transmission, density measurement, hardness, and index of refraction. The translucency and color of the sample were measured using SAS2000 calorimeter. Examples 1, 2, and 3 are the high-pressure and high temperature runs made using Y72 glass containing 0.17 wt-% $Cr_2O_3$.

Example 1

The sample (Y72-Ta-36) was annealed at 5.2 GPa and 1550° C. for 1 hour. The examination of the sample showed a dense highly translucent green material. The density of the sample was 3.30 gm/cc indicating that glass had fully converted to the jadeite phase. The sample was semi-polished to cabochon shape with a thickness of 2.7 mm. The index of refraction was 1.65480. The calorimeter measurement yielded following values.

L*=61.2 a*=−55.1 b*=31.8

Example 2

The sample (Y72-Ta-40b) was annealed at 5.2 GPa and 1575° C. for 1 hour. The run resulted in a dense highly translucent green material with a density of 3.31 gm/cc. The sample was semi-polished to cabochon shape with a thickness of 3.3 mm. The calorimeter measurement yielded following values.

L*=59.9 a*=−56.1 b*=31.8

Example 3

This sample (Y72-56) was annealed at 5.2 GPa and 1575° C. for 45 minutes without using tantalum foil around the glass cylinder. The run resulted in a dense highly translucent greenish yellow material with density of 3.32 gm/cc. The sample was semi-polished to cabochon shape with a thickness of 3.3 mm. The calorimeter measurement yielded following values;

L*=60.4 a*=−55.1 b*=31.5

Figure 14:
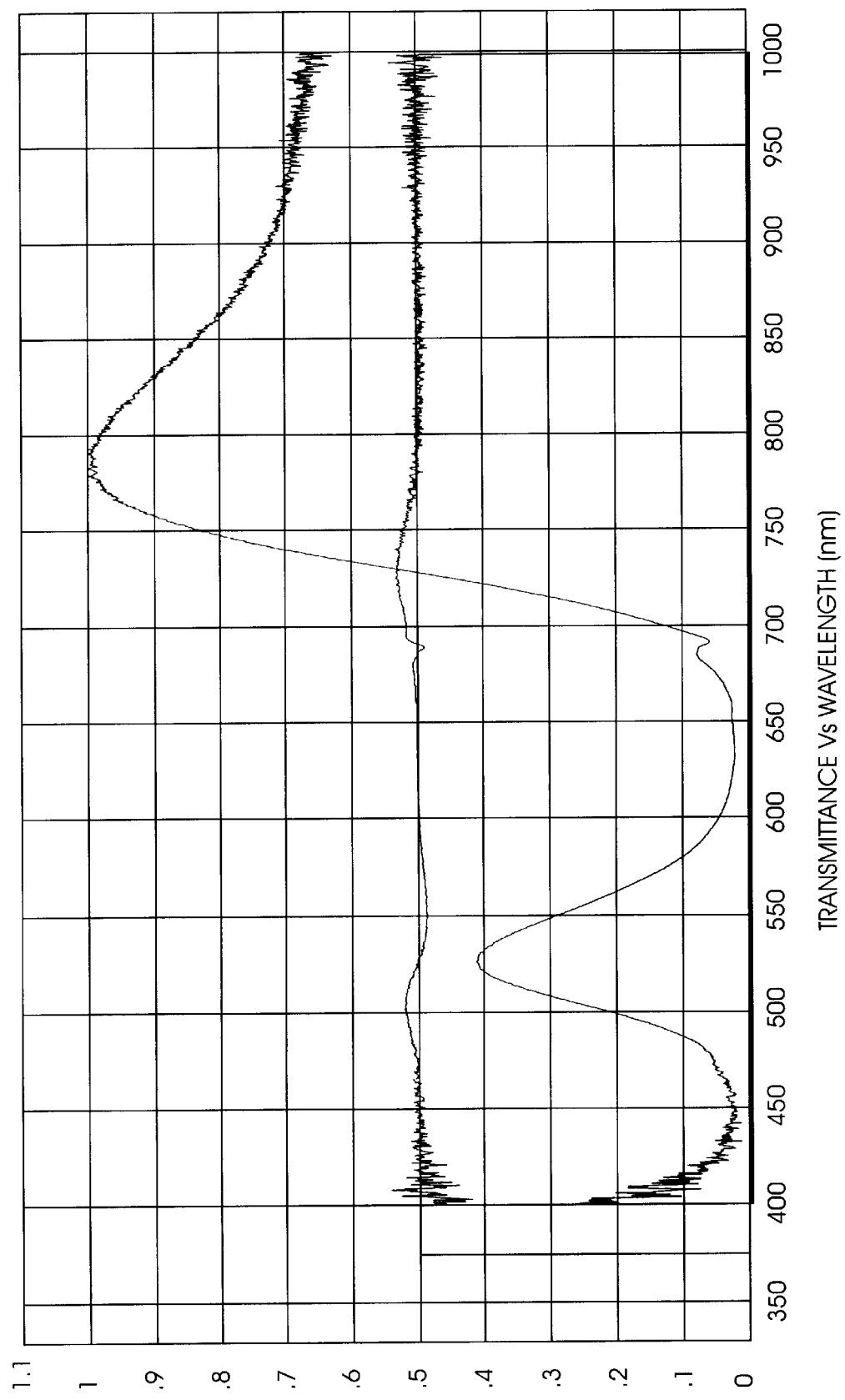
FIG. 14 is a continuous transmission spectrum for the inventive jadeite sample of Example 3.

The continuous spectrum of this sample is set forth in FIG. 14. Again, an "Imperial" jadeite product has been made.

Example 4

Prior Art Comparison

In order to verify prior art of sintering glass powder by DeVries and Fleischer, supra, and Zhao, et al., supra, Y72 glass (sample Y72-54P) was crushed and −60/+100 mesh size powder was separated. The powder was loaded in the high-pressure cell and was sintered at 5.2 GPa and 1575° C. for 1 hour. A sintered compact was obtained which was almost opaque and light green in color. The density of the compact was 3.28 gm/cc. The compact was polished to 4.6-mm thickness. The colorimeter measurements yielded following:

L*=32.3 a*=−2.8 b*=3.2

The foregoing results clearly show that the solid-glass method described in the current invention (viz., conversion of solid block of glass to jadeite) provides superior results than that of prior art method (sintering and conversion of glass powder to Jadeite) in obtaining a gem quality jadeite with translucency and color comparable to those for natural Imperial grade green jadeite.

Example 5

A cylindrical glass sample (Y71-L1) with stoichiometric $NaAlSi_2O_6$ composition, dimensions of 22.4 mm diameter and 10.2 mm thick, and weighing 47.2 carats was processed at 6.0 GPa and 1400° C. for 45 minutes. The run resulted in a white translucent material with dimensions of 20.3 mm and 8.9 mm thickness and with a density of 3.32 gm/cc, indicating that glass was converted to jadeite. XRD analysis further confirmed that the resultant sample is jadeite. This example shows that large jadeite samples can be made using the solid glass block approach.

Example 6

A glass sample (75-134-3) containing 4.2 wt-% $Mn_3O_8$ and weighing 7 carats was surrounded by 0.015" thick Grafoil layer and then pressed into a graphite pill. The sample was run at 6.0 GPa and 1400° C. for 45 minutes. The resulting sample was deep purple in color with density of 3.33 gm/cc, indicating that it was completely converted to jadeite.

The following examples (Example 7–11) were made with SP1 glass (jadeite material precursor glass block) having the stoichiometric composition of $NaAlSi_2O_6$ and containing 0.17 wt.-% of $Cr_2O_3$. The glass samples were in the form of cylinders that measured 14.0 mm in diameter and were 7.6 mm thick. The samples were wrapped with a single layer of 0.38 mm thick Grafoil graphite sheet and then with a 0.051 mm thick tantalum foil. The following results were recorded.

Example 7

A precursor cylindrical glass sample (SP1-23) was annealed at 5.6 GPa and 1600° C. for 75 minutes. The examination of the sample showed a dense, highly translucent green jadeite material. The density of the jadeite sample was 3.33-gm/cc, indicating that the glass had completely converted to jadeite. The sample was semi-polished to cabochon shape with a thickness of 3.3 mm. The colorimeter results yielded following results.

L*=68.0 a*=−56.3 b*=32.6

Example 8

A cylindrical glass sample (SP1-24) was annealed at 5.6 GPa and 1650° C. for 45 minutes. The examination of the sample showed a dense highly translucent green material. The density of the sample was 3.33-gm/cc indicating that glass had completely converted to jadeite. The sample was semi-polished to cabochon shape with a thickness of 3.3 mm. The calorimeter results yielded following results.

L*=68.3 a*=−55.8 b*=31.9

Example 9

A cylindrical glass sample (SP1-25) was annealed at 5.3 GPa and 1600° C. for 75 minutes. The examination of the sample showed a dense highly translucent green material. The density of the sample was 3.33-gm/cc indicating that glass had completely converted to jadeite. The sample was semi-polished to cabochon shape with a thickness of 3.2 mm. The calorimeter results yielded following results.

L*=68.9 a*=−57.1 b*=31.9

Example 10

A cylindrical glass sample (SP1-27) was annealed at 5.6 GPa and 1650° C. for 45 minutes. The examination of the sample showed a dense highly translucent green material. The density of the sample was 3.35-gm/cc indicating that glass had completely converted to jadeite. The sample was semi-polished to cabochon shape with a thickness of 3.3 mm. The calorimeter results yielded following results.

L*=66.9 a*=−54.8 b*=32.8

Example 11

A cylindrical glass sample (SP1-31) was annealed at 5.6 GPa and 1700° C. for 25 minutes. The examination of the sample showed a dense highly translucent green material. The density of the sample was 3.35-gm/cc indicating that glass had completely converted to jadeite. The sample was semi-polished to cabochon shape with a thickness of 4.0 mm. The colorimeter results yielded following results.

L*=65.9 a*=−61.5 b*=37.5

The results reported for Examples 7–11 are summarized below in the following table.

TABLE 5

| Example # | ID # | Thick (in) | L* | a* | b* | C | Hue Angle | GPa | Time (min) | Temp ° C. | Density (g/cc) |
| --- | --- | --- | --- | --- | --- | --- | --- | --- | --- | --- | --- |
| 7 | SP1-23 | 0.129 | 68.0 | −56.3 | 32.6 | 65.1 | 149.9° | 5.6 | 75 | 1600 | 3.33 |
| 8 | SP1-24 | 0.130 | 68.3 | −55.8 | 31.9 | 64.3 | 150.3° | 5.6 | 45 | 1650 | 3.33 |
| 9 | SP1-25 | 0.125 | 68.9 | −57.1 | 31.9 | 65.4 | 150.8° | 5.3 | 75 | 1600 | 3.33 |
| 10 | SP1-27 | 0.130 | 66.9 | −54.8 | 32.8 | 63.9 | 149.1° | 5.6 | 45 | 1650 | 3.35 |
| 11 | SP1-31 | 0.158 | 65.9 | −61.5 | 37.5 | 72.0 | 148.6° | 5.6 | 25 | 1700 | 3.35 |

What is claimed is:

1. A jadeite material having a size in any dimension in excess of about 1.0 mm, CIELAB indices of L*>42, a*<−6, or b*>6, and a grain size of less than about 30 microns.

2. The jadeite material of claim 1, which has an equiaxed grain structure.

3. The jadeite material of claim 2, which has an average grain size of between about 2 and 30 microns.

4. The jadeite material of claim 1, wherein L* is between about 42 and 75, a* is between about −6 and −65, and b* is between about 6 and 40.

5. The jadeite material of claim 1, having a composition that can be represented by:

(Na, Alkali or Alkaline Earth)(Al, Transition Element, Rare Earth Element) $Si_2O_6$ where, there is 0–0.2 mole of an alkali or alkaline earth metal element, 0–0.5 mole of a transition element, and 0–0.5 moles of a rare earth element.

6. The jadeite material of claim 5, said transition element is one or more of Fe, Cr, Mn, Ti, V, Cu or Ni; said alkaline or alkaline earth element is one or more of K, Li, Ca, or Mg; and said rare earth element is one or more of Nd, La, Ce, Pr, Sm, Eu, Pm, Gd, Tb, Dy, Ho, Er, Tm, Yb, or Lu.

7. A jadeite material with a size in any dimension over 1.0 mm and an optical transmission peak between 500 and 565 nm with an $I/I_O$ optical transmission ratio of over 40%.

8. The jadeite material of claim 7, which has a grain size of less than about 30 microns and has an equiaxed grain structure.

9. The jadeite material of claim 7, which has a size in any dimension in excess of about 1.0 mm, CIELAB indices of L*>42, a*<−6, or b*>+6.

10. The jadeite material of claim 5, which is represented by:

(0.9 Na, 0.042 K, 0.058 Li)$AlSi_2O_6$.

11. The jadeite material of claim 5, which is represented by:

(0.9 Na, 0.016 K, 0.084 Ca)(0.926 Al, 0.084 Mg)$Si_2O_6$.

12. The jadeite material of claim 5, which is represented by:

(Na)(0.9 Al, 0.072 Mn, 0.028 B)$Si_2O_6$.

13. The jadeite material of claim 5, which is represented by:

(0.955 Na, 0.055 X)(0.9 Al, 0.05 5Fe, 0.045 B)$Si_2O_6$.

where, X is one or more of Mg, Ca, Ba, or Be.

14. The jadeite material of claim 5, which is represented by:

(Na)(0.99 Al, 0.0078 Cr, 0.0022 B)$Si_2O_6$.

15. The jadeite material of claim 5, wherein Al is substituted with one or more of: (1) 64 mol-% $Ni^{+2}$ and 36 mol % $B^{+3}$; (2) 55 mol-% $Co^{+2}$ and 45 mol % $B^{+3}$; (3) 26 mol-% $Fe^{+2}$ and 74 mol-% $Be^{+2}$; or (4) 31 mol-% $Co^{+2}$ and 69 mol-% $Be^{+2}$.

16. A method for making jadeite material having a size in any dimension in excess of about 1.0 mm and total reflectance CIELAB indices of L*>42, a*<−6, or b*>6, which comprises the steps of:

(a) wrapping a jadeite material precursor glass block convertible by HP/HT into jadeite having a nominal composition of $NaAlSi_2O_6$ with a graphite or refractive metal sheet;

(b) placing said sheet wrapped glass block in an HP/HT apparatus;

(c) heating said sheet wrapped glass block at a pressure in excess of 3 GPa at a heating rate of greater than 100° C. per minute;

(d) subjecting said sheet wrapped glass block to a pressure in excess of about 3 GPa and a temperature in excess of about 1000° C. for a time adequate to convert said glass block into jadeite;

(e) cooling said jadeite material at a rate greater than 100° C. per minute and subsequently releasing said pressure; and (f) recovering said jadeite material from said cell.

17. The method of claim 16, wherein said glass block has a nominal composition of $NaAlSi_2O_6$ and contains $Cr_2O_3$.

18. The method of claim 16, wherein said glass block contains between about 0.1 and 0.5 wt-% of $Cr_2O_3$.

19. The method of claim 16, wherein said pressure ranges between about 3 and 6 GPa and Bald temperature ranges from between about 1000° and 1800° C.

20. The method of claim 16, wherein said time ranges from between about 5 minutes and 72 hours.

21. The method of claim 16, wherein said glass block also is wrapped in foil of one or more of the following Ta, W, Nb, Mo, Zr, Ti, Hf, Va, Cr, Th, U, or alloys thereof.

22. The method of claim 16, wherein said wrapped glass block is placed in a pressure transmitting medium comprising one or more powders of graphite, sodium chloride, aluminum oxide, or hexagonal boron nitride.

23. The method of claim 16, wherein the jadeite material made has an average grain size of less than about 30 microns and has an equiaxed grain structure.

24. The method of claim 23, which has an average grain size of between about 2 and 30 microns.

25. The method of claim 16, wherein the jadeite material made has an L* of between about 42 and 75, a* of between about −6 and −65, and b* of between about 6 and 40.

26. The method of claim 16, wherein the jadeite material made has an optical transmission peak between 500 and 565 nm with an $I/I_O$ optical transmission ratio of over 40%.

27. The method of claim 16, wherein said glass block comprises: 0.8–1.2 mole of a Na component, 0.8–1.2 moles of an Al component, 1.6–2.4 moles of a Si component, 4.8–7.2 moles of an oxygen component, 0–0.2 mole of an alkaline or alkaline earth element, 0–0.5 mole of a transition element, and 0–0.5 moles of a rare earth element.

28. The method of claim 27, wherein said transition element is one or more of Fe, Cr, Mn, Ti, V, Cu, or Ni.

29. The method of claim 28, wherein said alkaline or alkaline earth element is one or more of K, Li, Ca, or Mg.

30. The method of claim 26, wherein said glass block comprises: 0.8–1.2 moles of Na component, 0.8–1.2 mole of Al component, 1.6–2.4 moles of a Si component, 4.8–7.2 moles of an oxygen component, 0–0.2 moles of an alkaline earth element, and 0–0.5 moles of a transition element.

31. The method of claim 30, wherein said alkaline earth element is one or more of Ca or Mg; and said transition element is one or more of Fe, Cr, or Mn.

32. The method of claim 27 wherein said rare earth element is one or more of Nd, La, Ce, Pr, Sm, Eu, Pm, Gd, Tb, Dy, Ho, Er, Tm, Yb, or Lu.

33. The method of claim 16, wherein said jadeite material has a thickness and said glass block has a color center (impurity), wherein the color center concentration of the glass block is inversely proportional to thickness of the jadeite material according to the following equation:

$$I(X1)/I(X2)=X1/X2$$

where, I(X1) and I(X2), respectively, are the impurity concentrations necessary to maintain color and translucency constant at jadeite material thicknesses X1 and X2.

34. The method of claim 16, wherein said jadeite material precursor glass block has an extra 0.5 to 1 mol-% of $Al_2O_3$ added thereto, which is heated for a time adequate to cause precipitation of fine $Al_2O_3$, which causes said jadeite material to be opaque white in color.

35. The method of claim 16, wherein said jadeite material precursor glass block is heated at a temperature below the liquidus region for a time adequate to cause a precipitation of a small amount of microscopic one or more of nepheline ($Na_2O \cdot Al_2O_3 \cdot 2SiO_2$) or albite ($Na_2O \cdot Al_2O_3 \cdot 6SiO_2$), which causes said jadeite material to be opaque white in color.

36. The method of claim 16, wherein said jadeite material precursor glass block has about 0.05 mol-% Ti and about 0.05 mol-% Fe added thereto for producing said jadeite material which is blue in color.

37. The method of claim 16, wherein said jadeite material precursor glass block has about 0.1 mol-% Cr and about 0.1 mol-% Mg added thereto for producing said jadeite material which is orange in color.

38. The method of claim 16, wherein said jadeite material is represented by:

(0.9 Na, 0.042 K, 0.058 Li)$AlSi_2O_6$.

39. The method of claim 16, which is represented by:

(0.9 Na, 0.016 K, 0.084 Ca)(0.926 Al, 0.084 Mg)$Si_2O_6$.

40. The method of claim 16, wherein said jadeite material is represented by:

(Na)(0.9 Al, 0.072 Mn, 0.028 B)$Si_2O_6$.

41. The method of claim 16, wherein said jadeite material is represented by:

(0.955 Na, 0.055 X)(0.9 Al, 0.05 5Fe, 0.045 B)$Si_2O_6$ where, X is one or more of Mg, Ca, Ba, or Be.

42. The method of claim 16, wherein said jadeite material is represented by:

(Na)(0.99 Al, 0.0078 Cr, 0.0022 B)$Si_2O_6$.

43. The method of claim 16, wherein Al is substituted with one or more of: (1) 64 mol-% $Ni^{+2}$ and 36 mol% $B^{+3}$; (2) 55 mol-% $Co^{+2}$ and 45 mol % $B^{+3}$; (3) 26 mol-% $Fe^{+2}$ and 74 mol-% $Be^{+2}$; or (4) 31 mol-% $Co^{+2}$ and 69 mol-% $Be^{+2}$.

44. A jadeite material whose color corresponds with an L* value and a C value and wherein:

for a Green color, the L* value is in the range of 45–75 and the C value is in the range of 60–75;

for an imperial Green color, the L* value is in the range of 45–75 and the C value is in the range of 60–73;

for a Yellow color, the L* value is in the range of 65–90 and the C value is in the range of 60–75;

for an Orange color, the L* value is in the range of 50–90 and the C value is in the range of 60–84;

for a Purple color, the L* value is in the range of 30–55 and the C value is in the range of 60–75;

for a Blue color, the L* value is in the range of 15–50 and the C value is in the range of 60–82.

45. The jadeite material of claim 44 wherein the L* and C values are as follows:

the L* value is 60 and the C value is 73 for the Green color;

the L* value is 65 and the C value is 73 for the Imperial Green color;

the L* value is 85 and the C value is 75 for the Yellow color;

the L* value is 80 and the C value is 82 for the Orange color;

the L* value is 40 and the C value is 75 for the Purple color;

the L* value is 26 and the C value is 81 for the Blue color.

46. A jadeite material precursor glass block convertible by high pressure/high temperature (HP/HT) into a jadeite gemstone having a thickness and wherein the glass block has a color center impurity, wherein the color center concentration of the glass block is inversely proportional to thickness of the jadeite gemstone according to the following equations:

$$C_i(X1)/C_i(X2) = X1/X2$$

where, $C_i(X1)$ and $C_i(X2)$, respectively, are the impurity concentrations necessary to maintain color and translucency constant at jadeite gemstone thicknesses X1 and X2.

47. An Imperial Green jadeite gemstone whose color center impurity concentration is inversely proportional to its thickness according to the following equation:

$$I(X1)/I(X2) = X1/X2$$

where, I(X1) and I(X2), are the impurity concentrations necessary to maintain color and translucency constant at gemstone thicknesses X1 and X2.

48. The Imperial Green jadeite gemstone of claim 47, wherein the color center impurity concentration of the glass block is inversely proportional to thickness of the jadeite gemstone for a thickness of about 4 mm and a Cr color center concentration of about 0.15 wt-%.

49. The product of the process of claim 34.
50. The product of the process of claim 35.
51. The product of the process of claim 36.
52. The product of the process of claim 37.
53. The product of the process of claim 38.
54. The product of the process of claim 39.
55. The product of the process of claim 40.
56. The product of the process of claim 41.
57. The product of the process of claim 42.
58. The product of the process of claim 43.

59. A method for making a material being one or more of a gem material or a ceramic material, and having a thickness in excess of about 1.0 mm, which comprises the steps of:

(a) wrapping a precursor glass block convertible by high pressure/high temperature (HP/HT) into said material with a graphite or refractive metal sheet, said glass block being one or more of a silicate, a germanate, a borate, or a phosphate;

(b) placing said sheet wrapped glass block in an HP/HT apparatus;

(c) heating said sheet wrapped glass block at a pressure in excess of 3 GPa at a heating rate of greater than 100° C. per minute;

(d) subjecting said sheet wrapped glass block to a pressure in excess of about 3 GPa and a temperature in excess of about 1000° C. for a time adequate to convert said glass block into said material;

(e) cooling said material at a rate greater than 100° C. per minute and subsequently releasing said pressure; and (f) recovering said material from said cell.

60. The method of claim 59, wherein said wrapped glass block is placed in a pressure transmitting medium comprising one or more powders of graphite, sodium chloride, aluminum oxide, or hexagonal boron nitride.

61. The method of claim 59, wherein said precursor glass block contains an impurity, which is one or more of an alkaline earth element; a transition element or a rare earth element.

62. The method of claim 61, wherein said impurity is one or more of Ca, Mg, Fe, Cr, Mn, Nd, La, Ce, Pr, Sm, Eu, Pm, Gd, Th, Dy, Ho, Er, Tm, Yb, or Lu.

* * * * *